(12) United States Patent
Corson

(10) Patent No.: US 10,506,437 B2
(45) Date of Patent: Dec. 10, 2019

(54) ADMISSION CONTROL SYSTEM FOR SATELLITE-BASED INTERNET ACCESS AND TRANSPORT

(71) Applicant: WorldVu Satellites Limited, St Helier (JE)

(72) Inventor: Mathew Scott Corson, Gillette, NJ (US)

(73) Assignee: WORLDVU SATELLITES LIMITED, St. Helier (JE)

( * ) Notice: Subject to any disclaimer, the term of this patent is extended or adjusted under 35 U.S.C. 154(b) by 252 days.

(21) Appl. No.: 15/468,774

(22) Filed: Mar. 24, 2017

(65) Prior Publication Data
US 2017/0280326 A1    Sep. 28, 2017

Related U.S. Application Data

(60) Provisional application No. 62/312,969, filed on Mar. 24, 2016.

(51) Int. Cl.
*G06F 11/30* (2006.01)
*H04B 7/185* (2006.01)
(Continued)

(52) U.S. Cl.
CPC ........ *H04W 12/08* (2013.01); *H04B 7/18519* (2013.01); *H04L 63/107* (2013.01);
(Continued)

(58) Field of Classification Search
CPC ..... H04W 12/08; H04W 40/12; H04W 84/06; H04B 7/18519; H04B 7/1851; H04B 7/18539; H04B 7/18582; H04L 63/107
See application file for complete search history.

(56) References Cited

U.S. PATENT DOCUMENTS

| | | | | |
|---|---|---|---|---|
| 6,049,593 A | * | 4/2000 | Acampora | H04B 10/11 379/56.2 |
| 6,366,761 B1 | * | 4/2002 | Montpetit | H04B 7/195 370/230 |

(Continued)

FOREIGN PATENT DOCUMENTS

EP    0658014 A1    6/1995

OTHER PUBLICATIONS

Alagoz, F., et al. "Fixed versus adaptive admission control in direct broadcast satellite networks with return channel systems." IEEE Journal on Selected Areas in Communications 22.2 (2004): 238-249. (Year: 2004).*

(Continued)

*Primary Examiner* — Michael Simitoski
(74) *Attorney, Agent, or Firm* — Sughrue Mion, PLLC

(57) ABSTRACT

Disclosed are improved systems and methods and techniques for satellite-based Internet access and transport that provides a broader view of satellite-based access facilities including full demand and supply in any locale, at any scale, independent of SNP/ACP coverage or Beam mobility. Accordingly, methods and systems according to aspects of the present disclosure, advantageously dimension and deploy the IP services (demand) against a predictable and geo-spatially-computable supply model—so that no (i.e. AR) is oversubscribed beyond a desired threshold in any of its CAs (supply) area.

9 Claims, 26 Drawing Sheets

(51) Int. Cl.
*H04W 12/08* (2009.01)
*H04L 29/06* (2006.01)
*H04L 9/32* (2006.01)
*H04W 84/06* (2009.01)
*H04W 40/12* (2009.01)

(52) U.S. Cl.
CPC ........ *H04B 7/1851* (2013.01); *H04B 7/18539* (2013.01); *H04B 7/18582* (2013.01); *H04W 40/12* (2013.01); *H04W 84/06* (2013.01)

(56) References Cited

U.S. PATENT DOCUMENTS

| | | | | |
|---|---|---|---|---|
| 6,738,363 | B1 * | 5/2004 | Best | H04W 72/10 370/322 |
| 9,479,993 | B2 * | 10/2016 | Benammar | H04W 36/30 |
| 2002/0181444 | A1 * | 12/2002 | Acampora | H04B 10/11 370/352 |
| 2006/0229090 | A1 * | 10/2006 | LaDue | H04W 84/04 455/507 |
| 2008/0165719 | A1 * | 7/2008 | Visotsky | H04B 7/2606 370/315 |
| 2009/0313007 | A1 * | 12/2009 | Bajaj | G06F 17/289 704/3 |
| 2010/0142445 | A1 * | 6/2010 | Schlicht | H04W 28/021 370/328 |
| 2010/0217964 | A1 * | 8/2010 | Peterka | G01R 31/31719 713/2 |
| 2014/0317694 | A1 * | 10/2014 | Grube | G06F 12/1408 726/4 |
| 2015/0312838 | A1 * | 10/2015 | Torres | H04B 7/18582 370/329 |
| 2016/0006500 | A1 * | 1/2016 | Radpour | H04B 7/18539 370/319 |
| 2016/0037434 | A1 * | 2/2016 | Gopal | H04W 40/246 370/316 |

OTHER PUBLICATIONS

Cho, Sungrae, et al. "A new connection admission control for spotbeam handover in LEO satellite networks." Wireless Networks 8.4 (2002): 403-415. (Year: 2002).*

Ercetin, Ozgur, et al. "A predictive QoS routing scheme for broadband low earth orbit satellite networks." 11th IEEE International Symposium on Personal Indoor and Mobile Radio Communications. PIMRC 2000. Proceedings (Cat. No. 00TH8525). vol. 2. IEEE, 2000. (Year: 2000).*

Iera, Antonio, Antonella Molinaro, and Salvatore Marano. "Call admission control and resource management issues for real-time VBR traffic in ATM-satellite networks." IEEE Journal on Selected Areas in Communications 18.11 (2000): 2393-2403. (Year: 2000).*

Imole, Olugbenga, Tom Walingo, and Fambirai Takawira. "Call admission control for multimedia connections in interactive satellite networks." AFRICON 2015. IEEE, 2015. (Year: 2015).*

Olariu, Stephan, and Petia Todorova. "QoS on LEO satellites." IEEE Potentials 23.3 (2004): 11-17. (Year: 2004).*

Uzunalioglu, Huseyin, Jeff W. Evans, and John Gowens. "A connection admission control algorithm for low earth orbit satellite networks." 1999 IEEE International Conference on Communications (Cat. No. 99CH36311). vol. 2. IEEE, 1999. (Year: 1999).*

Officer: Sylvia Lampreia, "International Search Report and the Written Opinion", issued in counterpart International PCT Patent Application No. PCT/US2017/024036, Completed Jul. 5, 2017, 14 pp.

* cited by examiner

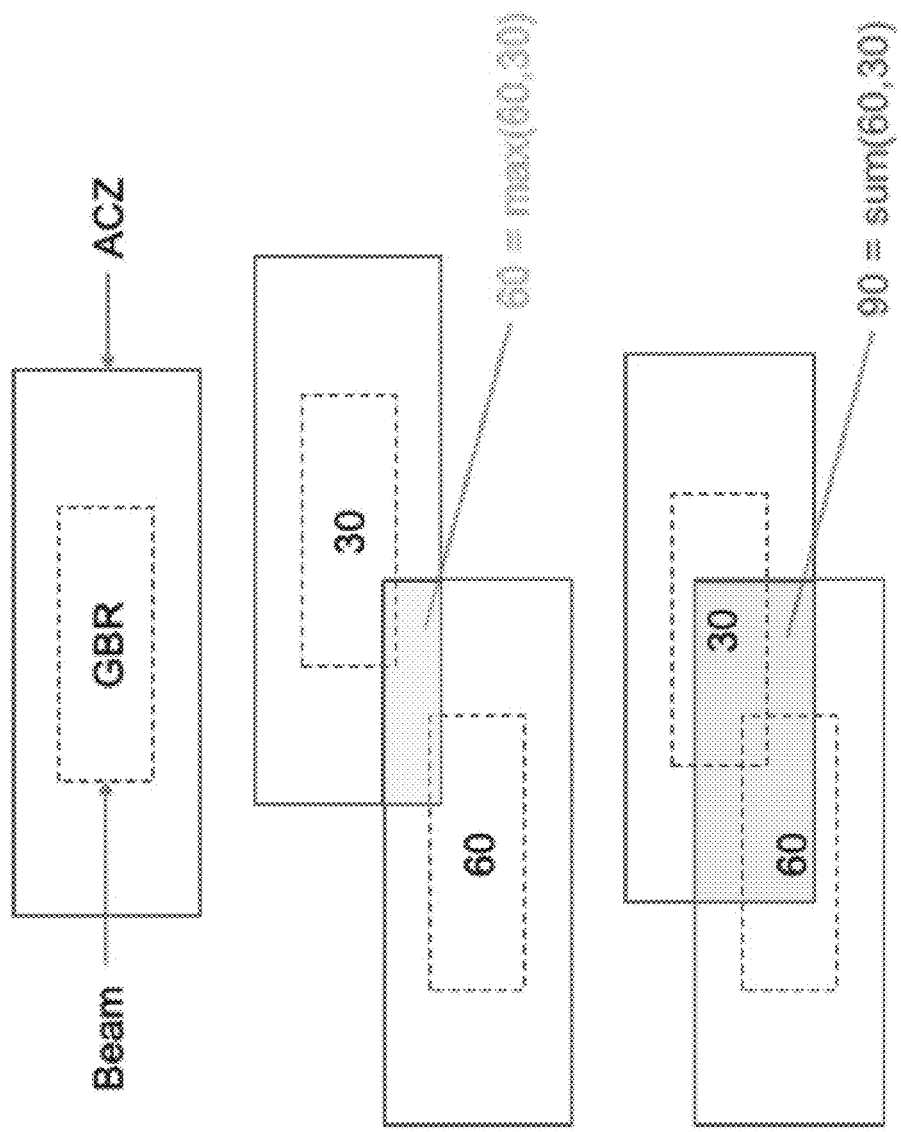

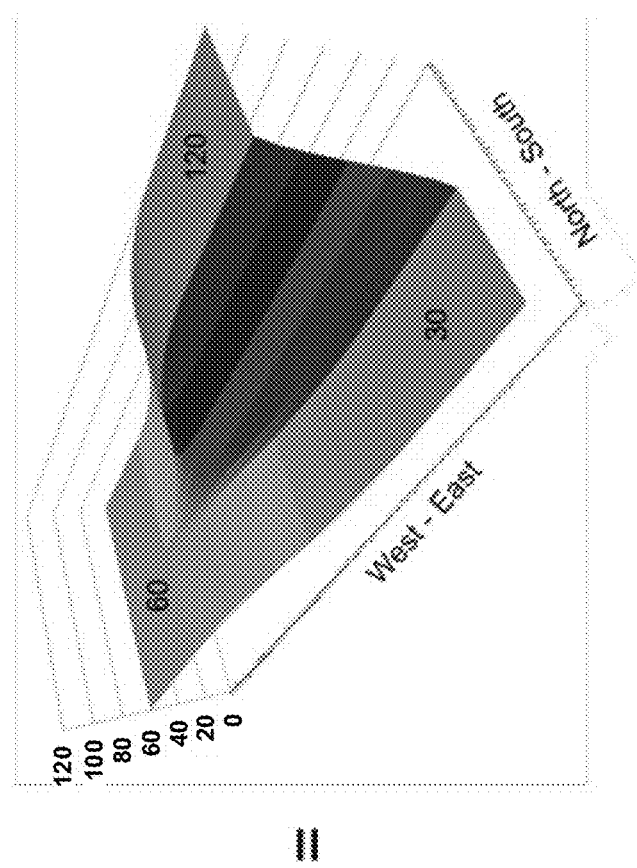
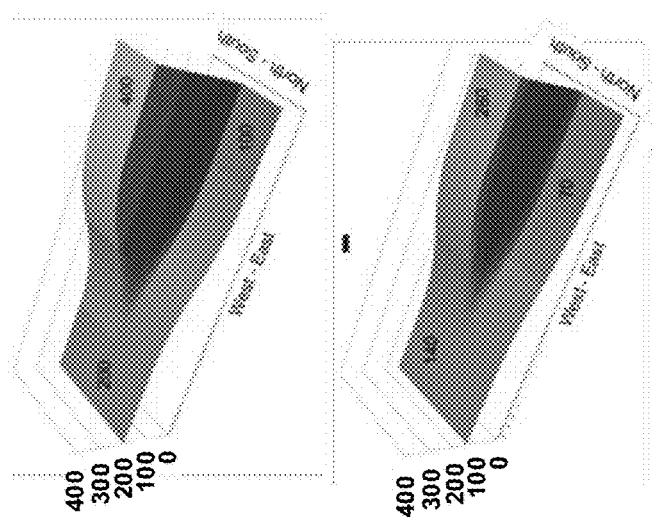
FIG. 22

ADMISSION CONTROL SYSTEM FOR SATELLITE-BASED INTERNET ACCESS AND TRANSPORT

CROSS REFERENCE TO RELATED APPLICATIONS

This application claims the benefit of U.S. Provisional Patent Application No. 62/312,969 filed Mar. 24, 2016 the entire contents of which are incorporated by reference as if set forth at length herein.

TECHNICAL FIELD

This disclosure relates generally to telecommunications. More particularly, it pertains to admission control for satellite-based Internet access and transport.

BACKGROUND

As the pervasiveness of the Internet continues to increase and impact everyday contemporary life, access to the Internet is of increasing importance. As readily appreciated, particular locations—whether terrestrial or airborne—oftentimes makes ready access difficult. One approach to these difficult access locations involves satellite-based internet access—and its attractiveness increases along with Internet pervasiveness. Accordingly, systems, methods and techniques that facilitate the deployment and subsequent administration of such satellite-based Internet access facilities—would represent a welcome addition to the art.

SUMMARY

An advance is made in the art according to aspects of the present disclosure directed to an admission control system for satellite-based Internet access and transport that advantageously provides a broader view of satellite-based access facilities including full demand and supply in any locale, at any scale, independent of satellite network portal (SNP)/anchor common point (ACP) coverage or Beam mobility. Accordingly, methods and systems according to aspects of the present disclosure, advantageously dimension and deploy the IP services (demand) against a predictable and geo-spatially-computable supply model—so that no (i.e. AR) is oversubscribed beyond a desired threshold in any of its CAs (supply) area.

More particularly, the present disclosure describes an admission control system for satellite based Internet access and transport network including a plurality of User Terminals (UTs) connected to a Terrestrial Ground Network (GN) via Low Earth Orbit (LEO) satellite constellations, the GN further connected to a Core Network (CN) which in turn is connected to the Internet, the admission control system comprising: a globally federated database configured to provide status information with respect to the UTs, the GN, the LEO and the CN; a static admission control component configured to always admit service subscribers to access the satellite based network for the lifetime of the service; and a dynamic admission control component configured to selectively admit service subscribers to access the satellite based network processing system for a session based quality of service (QoS) admission; wherein the admission control system is configured to provide access to the Internet and transport network that includes a moving set of beams each having independent schedules such that any service levels (SL) required by a UT are not violated.

This SUMMARY is provided to briefly identify some aspect(s) of the present disclosure that are further described below in the DESCRIPTION. This SUMMARY is not intended to identify key or essential features of the present disclosure nor is it intended to limit the scope of any claims.

The term "aspect" is to be read as "at least one aspect". The aspects described above and other aspects of the present disclosure are illustrated by way of example(s) and not limited in the accompanying drawing.

BRIEF DESCRIPTION OF THE DRAWING

A more complete understanding of the present disclosure may be realized by reference to the accompanying drawing in which:

FIG. 16 is a schematic block diagram illustrating ACZ Overlap and GBR Spatial Demand according to aspects of the present disclosure;

FIG. 22 are plots illustrating Ideal VBR-GBR Capacity Delta surfaces according to aspects of the present disclosure;

DETAILED DESCRIPTION

Figure 1:
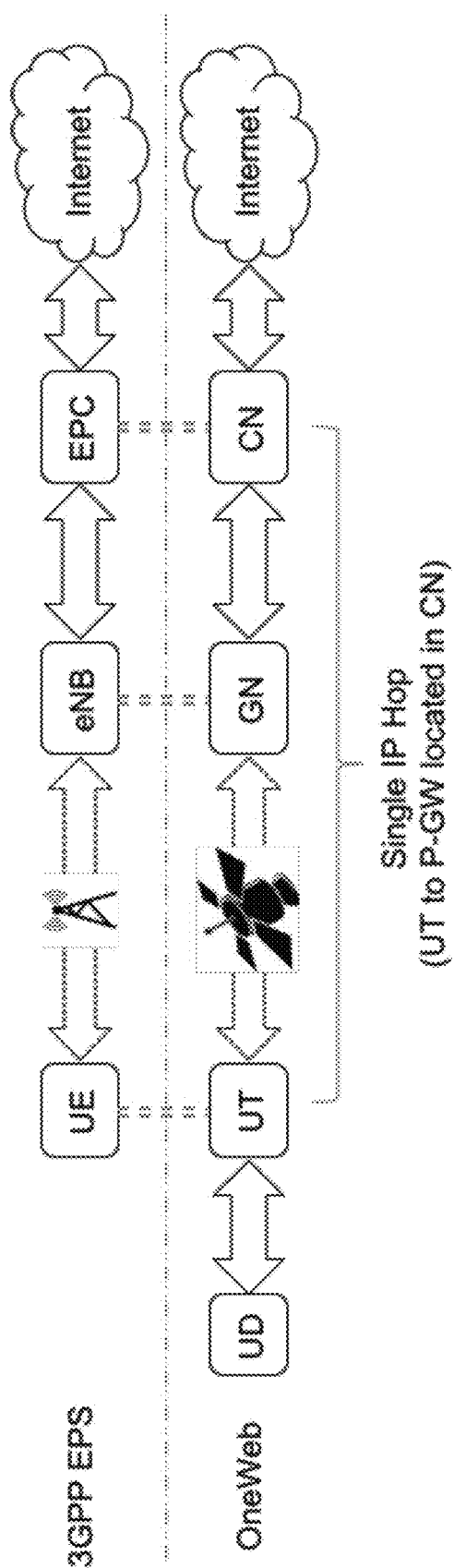
FIG. 1 shows a schematic diagram depicting an illustrative network architecture according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

By way of some additional background, we begin by noting that OneWeb is a name we have given to an Internet access and transport network that provides Internet Protocol (IP) devices access to the wider Internet. In this one sense, OneWeb may be viewed as similar to other, known Internet access communications technologies including optical fiber, cable, and cellular communications. However, as will become readily apparent to those skilled in the art, its access network topology is particular unique.

More particularly, we note that traditional network infrastructure systems and architectures have a fixed infrastructure serving both fixed and mobile users. In the OneWeb topology, an essential part of the network infrastructure itself—the satellites—are mobile. As we shall show, this difference significantly changes some aspects of the air interface resource management.

With reference now to FIG. 1, there is shown a schematic diagram illustrating a network architecture according to aspects of the present disclosure. More particularly—and as may be observed from that FIG. 1, a number of user terminals (UTs) connect to a terrestrial ground network (GN) via a low earth orbit (LEO) satellite constellation. As used herein, UTs are oftentimes customer premises equipment (CPE) access devices and provides access to the network in a manner somewhat analogous to a familiar cable—or other—modem. An IP host device (shown as user device (UD)) is connected to a UT through the effect of any of a number of known communications technologies including Ethernet, Wi-Fi, LTE, etc., and that UT then onward connects the host to the Internet via the OneWeb system.

At a certain high level of abstraction, the OneWeb system architecture shown in FIG. 1 bears some similarity to an architecture assocìeated with 3 GPP Evolved Packet System (EPS) which underpins Long-Term Evolution (LTE) cellular packet radio access. In particular—and as will be readily appreciated by those skilled in the art—LTE employs a User Equipment (UE) device (combined host/modem device) that connects to an Evolved Node B (eNB—a cellular base station) which in turn connects to an EPC (Evolved Packet Core) and onwards to the Internet as shown in FIG. 1. While similarities may seem apparent—and as noted above—the particulars with respect to air interface management differ markedly.

With LTE—a well known traditional cellular architecture—each eNB provide air interface capability over a pre-defined and static coverage area, often referred to as a "cell". In operation, the cells are oftentimes different in size, shape and capacity. The UEs in a cell consume air resource capacity under the control of the eNB. When UEs request resources to satisfy a given service demand (i.e., a phone call), the UE undertakes a dynamic, session-based Admission Control (AC) procedure to determine if the request is "admissible". If sufficient capacity exists in the cell to serve the call, it is allowed to proceed. If not, the request is denied. In LTE a given eNB controls the capacity over a given coverage for all UEs in that area at all times. It has full capacity supply (capacity) and demand (traffic load) information and is therefore well positioned to make the AC decision. Such is not often true for the satellite-based OneWeb system. To understand why, we must examine the composition and functioning of the GN.

As may now be understood by those skilled in the art, a GN includes two components—a Satellite Network Portal (SNP) and an Anchor Common Point (ACP)—which are separated by a OneWeb Service WAN (Wide Area Network) or SWAN. Each SNP includes many elements—most notably a LxP/BxP combination—which handles satellite beam scheduling. An ACO—in sharp contrast—is a sole entity which represents the overall GN as a fixed eNB to the CN.

The SNP-ACP separation is necessary due to the movement of the satellites, the movement of their service beams covering the UTs, the movement of their feeder links connected to the SNPs, and the corresponding need to hide beam, link and satellite movement from the CN.

Figure 2:
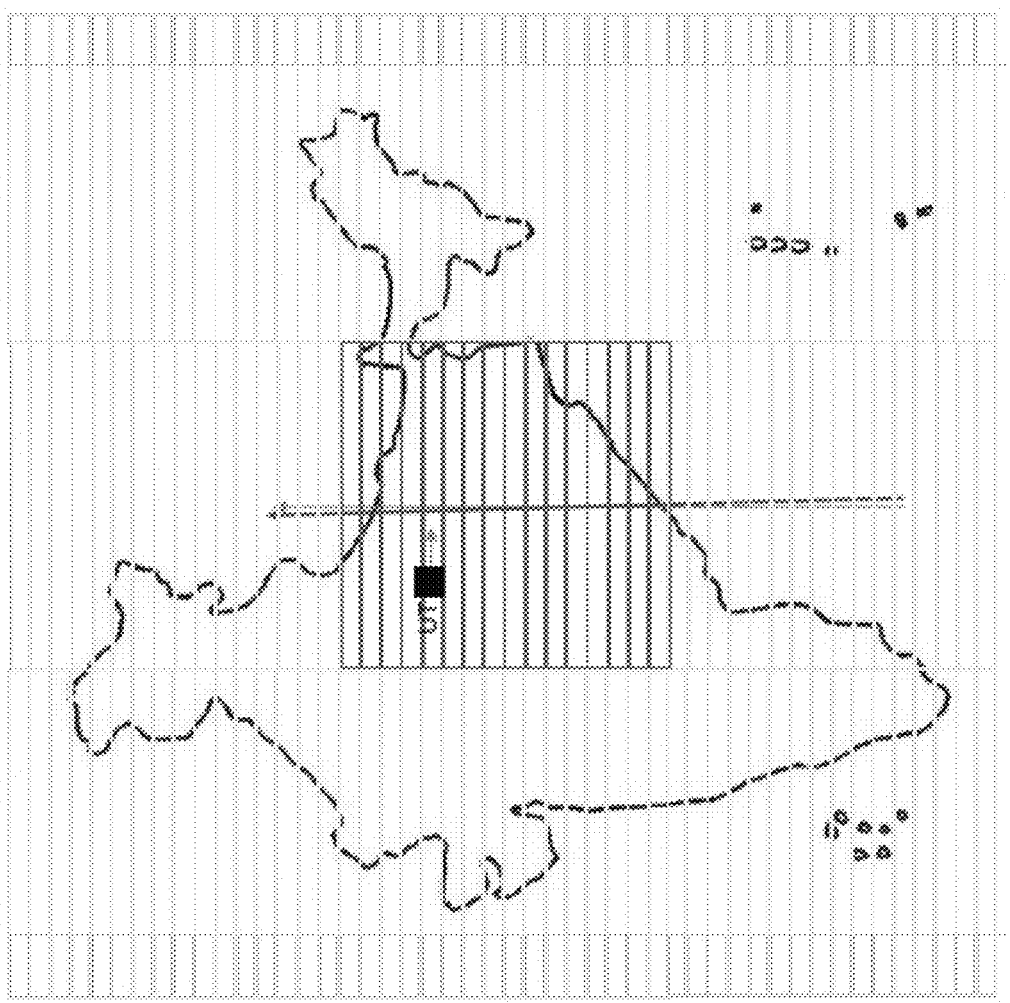
FIG. 2 shows a schematic diagram illustrating a single satellite spot beam coverage according to aspects of the present disclosure.

Turning now to FIG. 2, there is shown a schematic diagram depicting satellite spot beam coverage according to an aspect of the present disclosure. As may be understood, satellites are in polar orbit. The SNPs are located on a rotating Earth, as are many of the UTs they serve (some may be flying). All are moving very slowly relative to the satellites. Consequently, depending on a UTs location, its covering satellite will either be moving predominately northwards or southwards.

We note that the approximate path of a northbound satellite covering a UT in India is shown FIG. 2. Each satellite has associated with it 16 rectangular spot beams. A new spot beam passes over a given UT approximately every 11 seconds. Because the Earth is spinning, the UTs are also precessing in a West-East direction, and so the spot beams also slowly move East-to-West across the Earth's surface. Note further that it takes approximately 40 minutes to travel the East-West width of a spot beam. The dotted line shown in FIG. 2 illustrates the approximate path of a northbound satellite as it moves slightly to the West.

As will be appreciated, each UT occupies a unique location at any point in time. Each UT both sends and receives traffic from its location, which creates a "demand" for air interface capacity on both reverse and forward links. Multiple UTs will be spread throughout a given area as shown schematically in FIG. 3, where an assessment of 10, 30, and 50 Mbps Variable Bit Rate (VBR) traffic demands are depicted.

Figure 3:
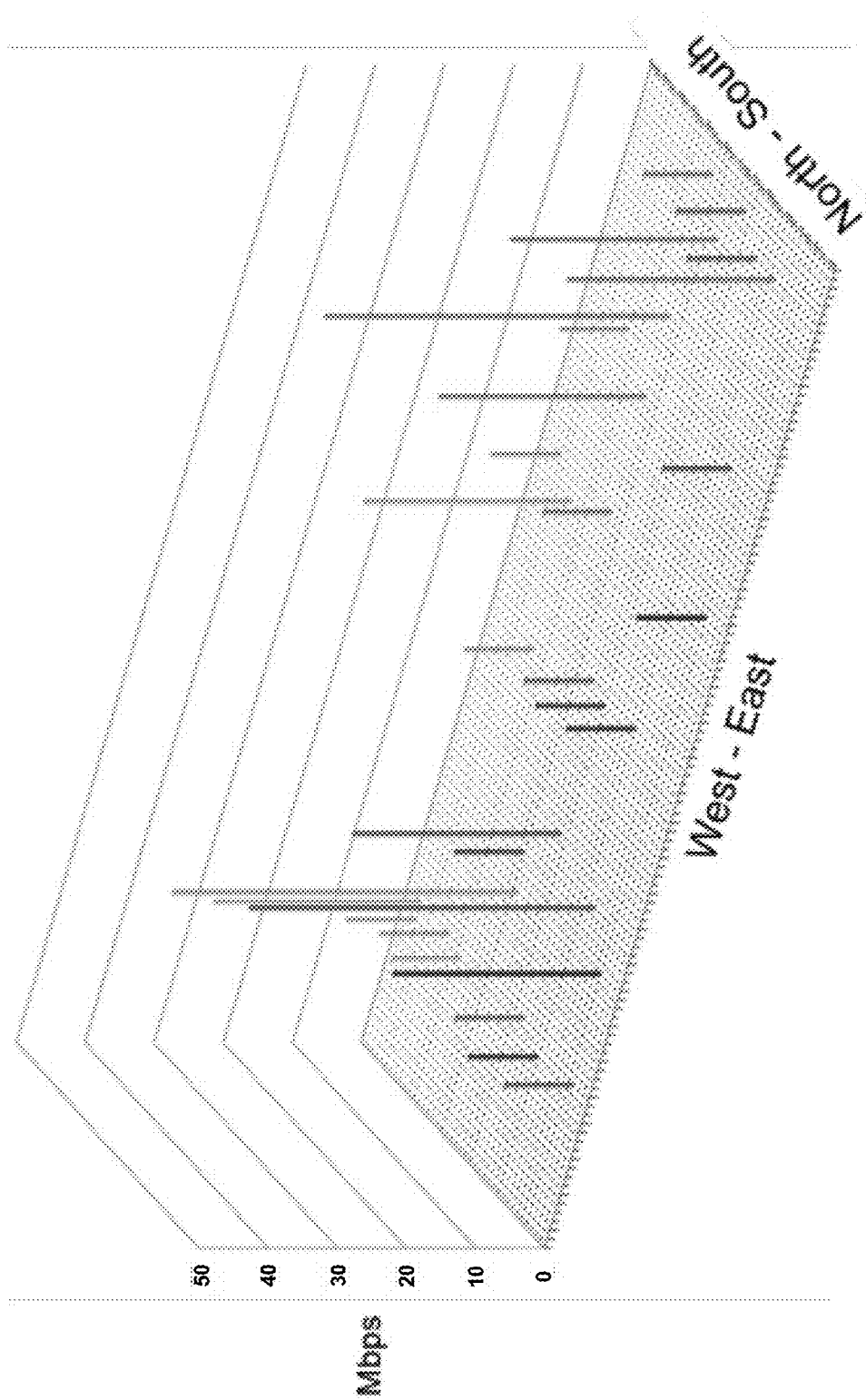
FIG. 3 shows a plot illustrating UT traffic demand according to aspects of the present disclosure.

One primary system requirement for satellite systems according to the present disclosure is that the traffic demand in any given area be maintained within acceptable bounds. One simple approach to this requirement includes simply adding-up the point-wise (location by location) demand as seen in FIG. 3. and then reconcile that against capacity. Unfortunately however, the air interface capacity is shared within a beam, and consequently two UTs which may possibly reside in the same beam have an effect on each others' available capacity over time. Consequently, because of the dynamics of spot beam movement over time, the relative locations of a pair of UTs determine the percentage of time they share a beam and therefore the relative percentage of time they compete for a beam's capacity. This results in what we call a geo-spatial distribution of UT demand throughout a zone as we shall now describe.

We note that surrounding each UT is an approximately rectangular zone—called its Admission Control Zone (ACZ)—measuring substantially twice the width and height of a satellite spot beam. Note further that while this is generally true at lower latitudes. At higher latitudes, the shape of an ACZ changes due to beam overlap, but the same concepts apply.

Figure 4:
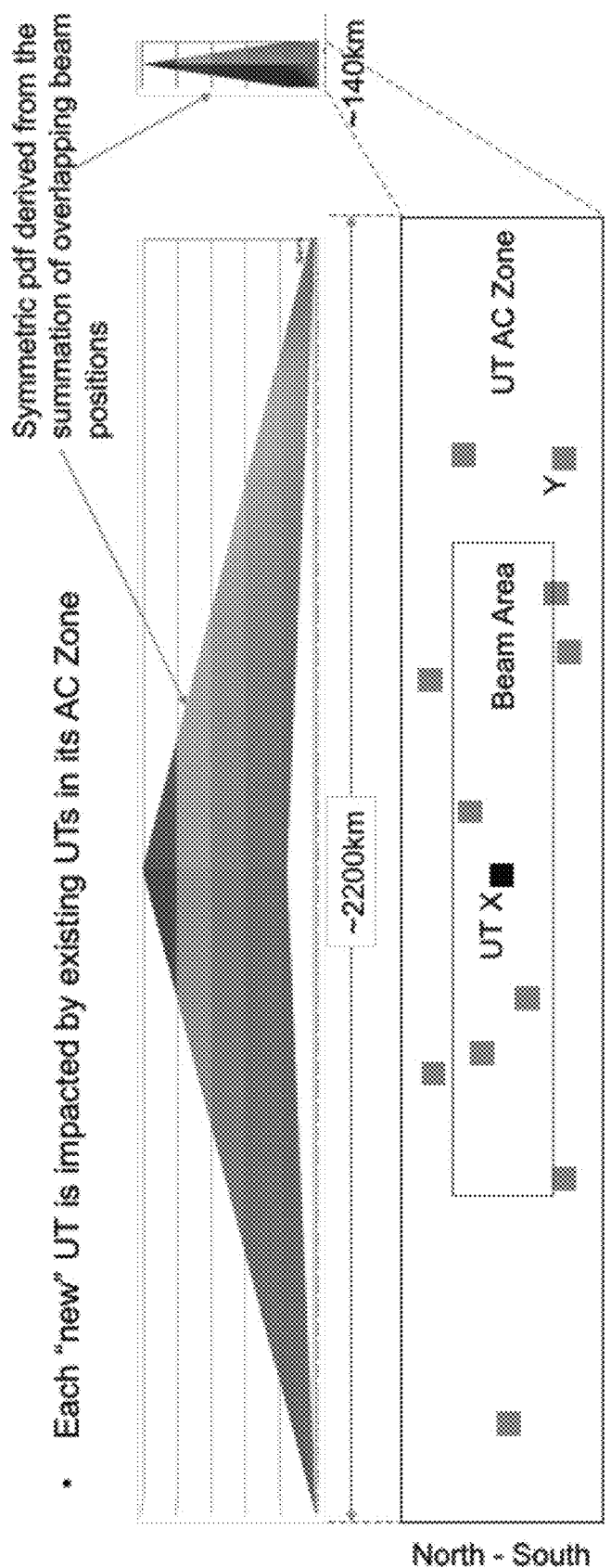
FIG. 4 shows a plot illustrating an Admission Control Zone according to aspects of the present disclosure.

A top-down view of an ACZ around a UT "X" is shown diagrammatically in FIG. 4. This ACZ shown applies for both VBR and GBR capacity. If a beam is nominally 1100×70 km rectangle, then an ACZ is approximately 2200× 140 km. The aCZ represents the geographic area over which UT X's capacity demand may affect (i.e., subtract from) the capacity supply available to other UTs in its ACZ. Thus, it is a reflexive relation.

Figure 5:
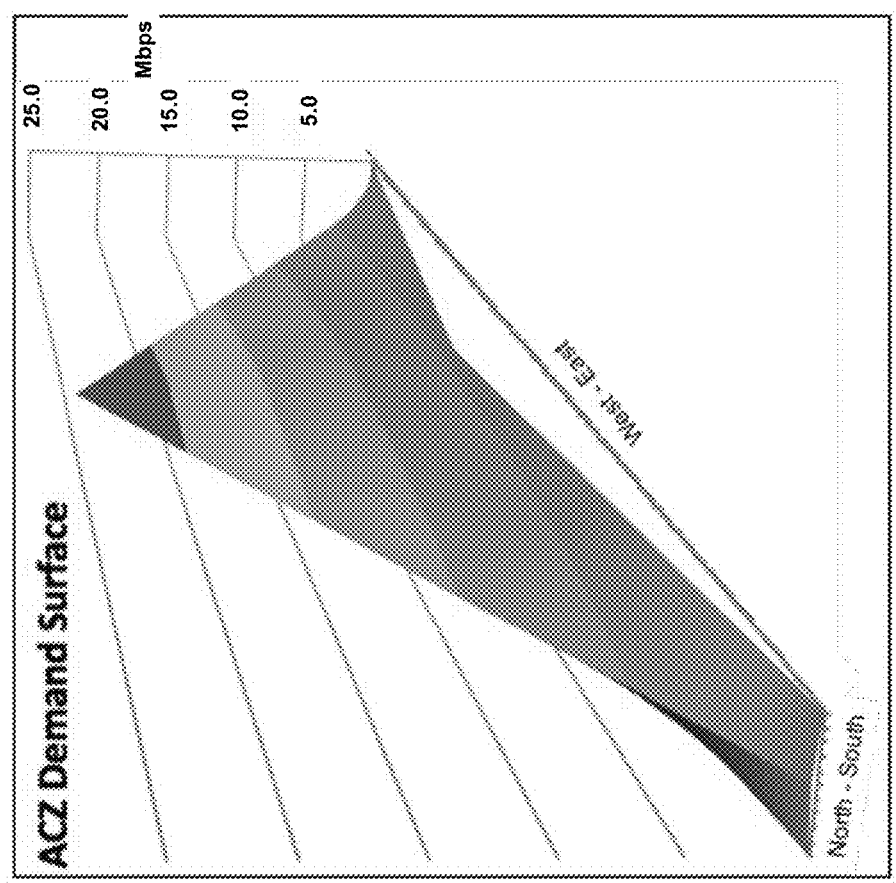
FIG. 5 is a plot illustrating a VBR demand surface according to aspects of the present disclosure.

At this point we note that for VBR demand, a probability density function (PDF) of a UT's traffic demand forms a 3-D Demand Surface across an ACZ, which is shown as 3-D graph in FIG. 5. as well as in the top half of FIG. 4, which is a 2D graph of its front and side views appear. The capacity a UT consumes (or demands) from its ACZ is a statistical function determined by beam shape and movement. More particularly, the closer a given location Y that is inside an ACZ is to its defining UT X (at the of the ACZ), the higher the statistical demand for capacity from UT X at Y's location center.

As may be observed, the shape of the VBR surface resembles a long, thin pyramid (although it is not precisely a pyramid geometrically-speaking) which has a "shark fin" shape. The surface has raised triangles along its sides, and there is a steepening/bending of the wall slopes as one moves towards the center.

Unsurprisingly, there is a strong east-west spatial correlation of demand. The North-South correlation is identical in form, but reduced in magnitude, again arising from the narrowness of the beams which create the density function. The "height" of the surface shown in FIG. 5 would correspond to a point source VBR demand of 25 Mbps (a relatively large demand for the OneWeb system) that is not oversubscribed. However, all VBR demands are expected to be oversubscribed to some degree, which reduces the effective rate for dimensioning purposes as we will subsequently show.

Figure 6:
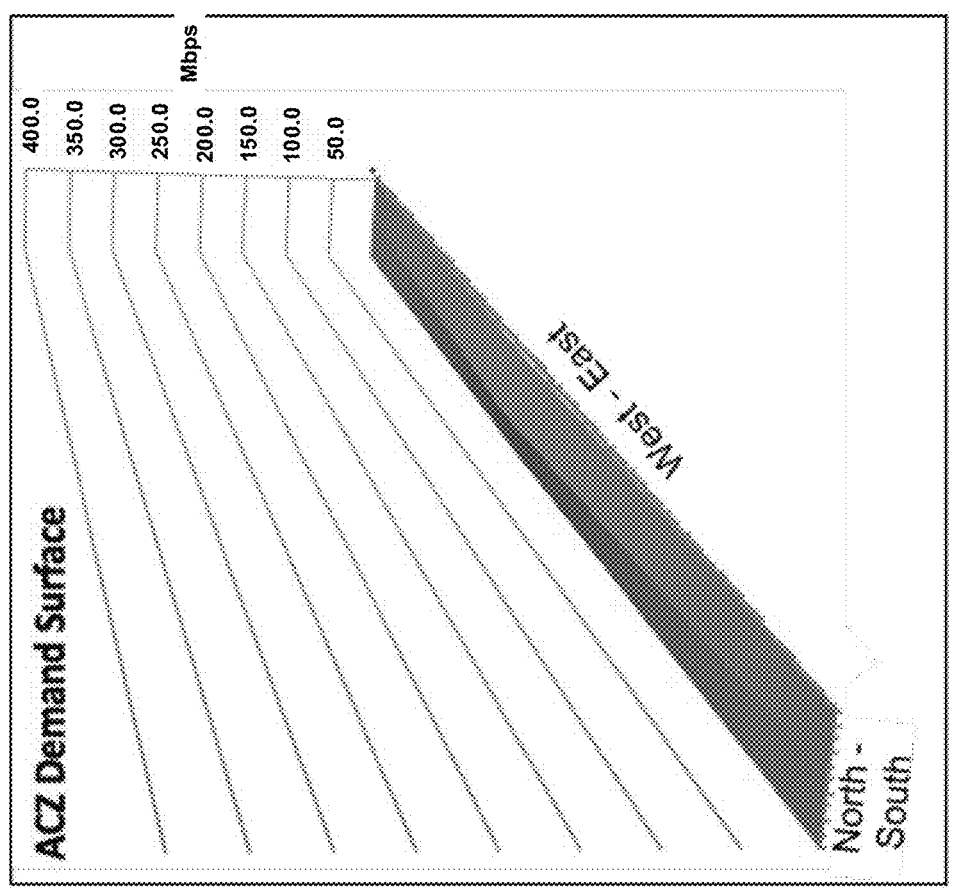
FIG. 6 is a plot illustrating 25 Mbps Demand according to aspects of the present disclosure.

For the purposes of our discussion here, we assume a clear sky beam capacity of 400 Mbps. The relative size of a 25 Mbps ACZ demand surface in the context of a 400 Mbps beam capacity is shown in FIG. 6, which—at first glance—may appear to be a small demand but which would be even smaller with an oversubscription factor>1.

Figures 7A, 7B:
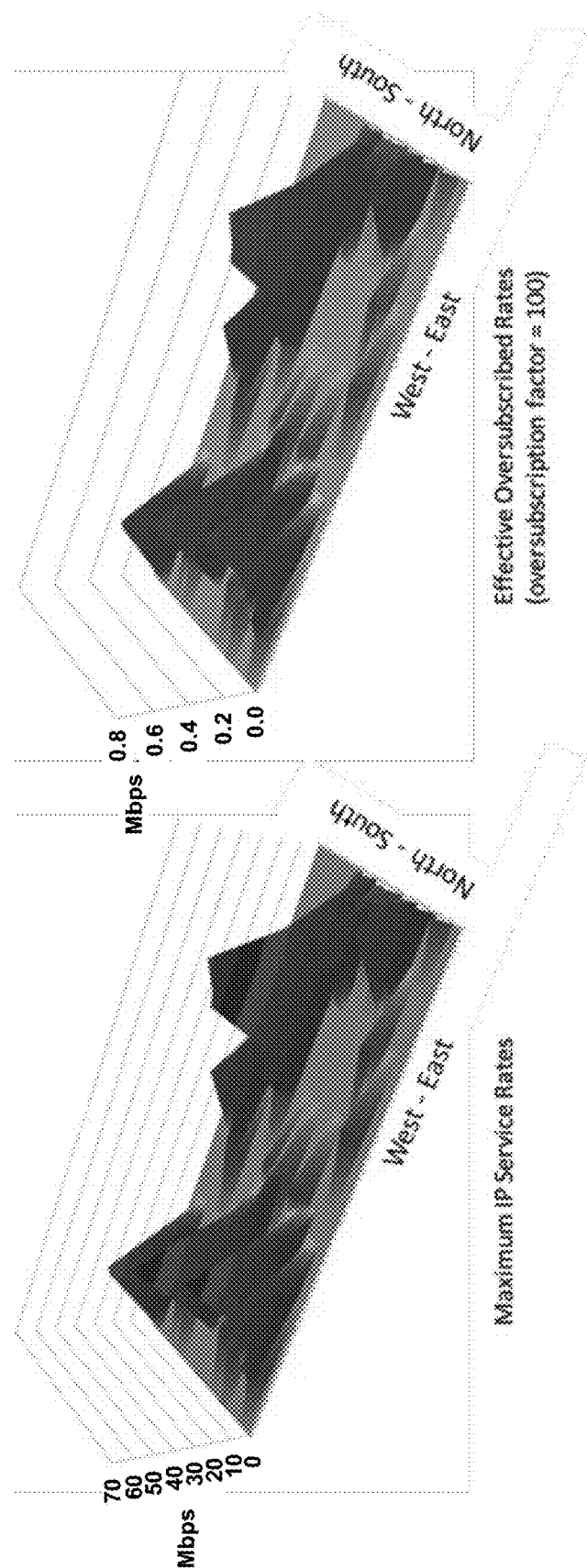
FIG. 7(A) and FIG. 7(B) are plots illustrating a VBR demand surfaces according to aspects of the present disclosure.

Transforming the point demands of FIG. 3 into their corresponding ACZ demand surfaces creates an aggregate VBR demand Figure: UT Traffic Demand surface across the area as shown in FIG. 7(A) and FIG. 7(B) which are plots showing VBR demand surface(s). The maximum ("up to") IP Service rates are shown in FIG. 7(A), whilst the "scaled down" effective speed-based provisioning rates are shown in FIG. 7(B), reflecting an oversubscription factor of 100. Some individual shapes are seen to differ from the canonical ACZ demand surface shape, and that is because multiple, partially-overlapping ACZ surfaces are being to create the VBR demand surface.

Figure 8:
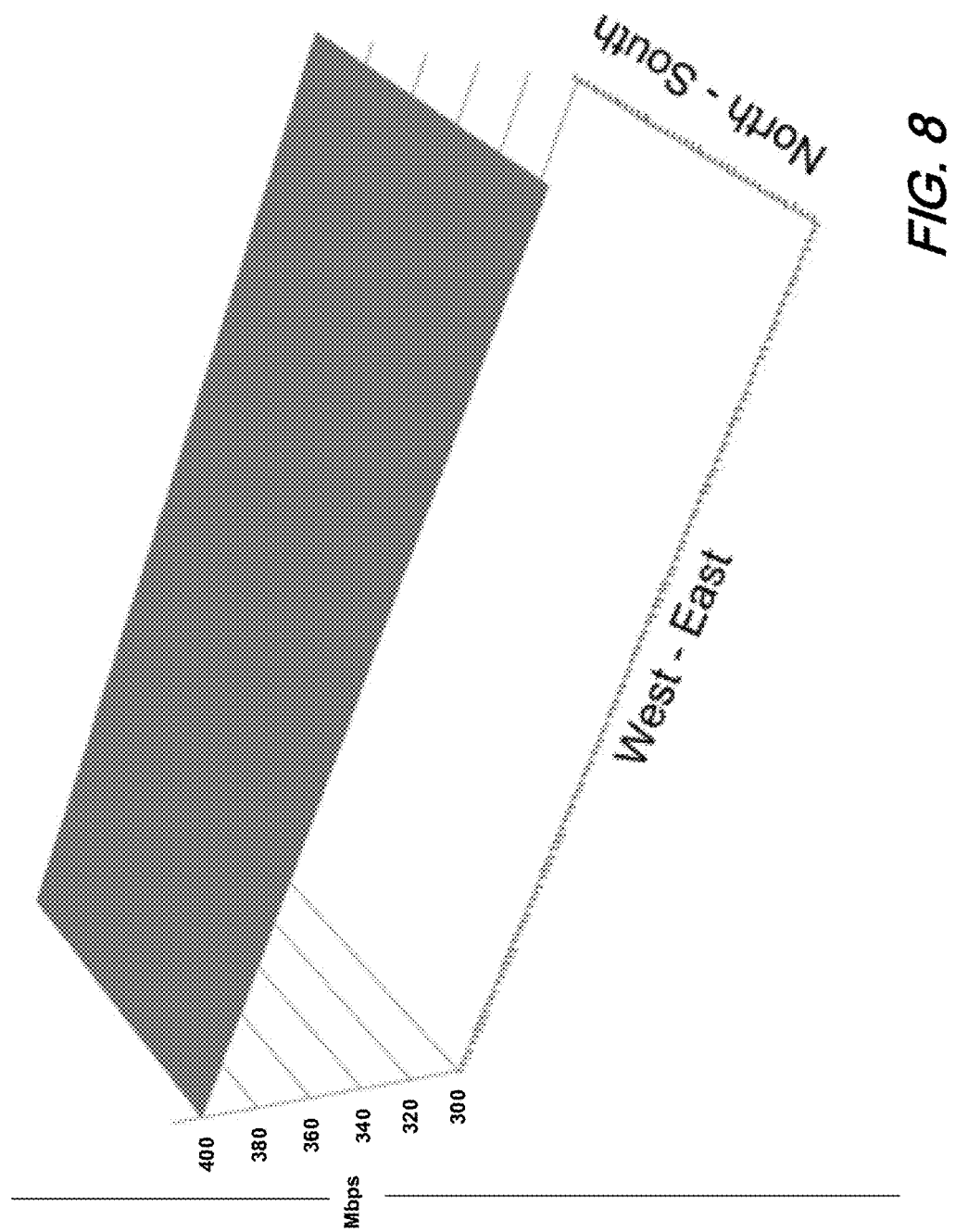
FIG. 8 is a plot illustrating a capacity surface according to aspects of the present disclosure.

Note that the "flip side" to the demand surface is the shown in FIG. 8—a graph of capacity surface—which indicates the capacity available geospatially. This simplistic (i.e. uniform) graph of FIG. 8 depicts a point-wise "Clear Sky" beam capacity of 400 Mbps. Clear Sky capacity assumes no rain, and is the capacity against which VBR demands will be dimensioned. The point-wise capacity along the surface reflects that of a beam prior to empty any traffic demand being utilized in this region. The surface here is larger than an individual ACZ as we have already seen.

Figures 9A, 9B:
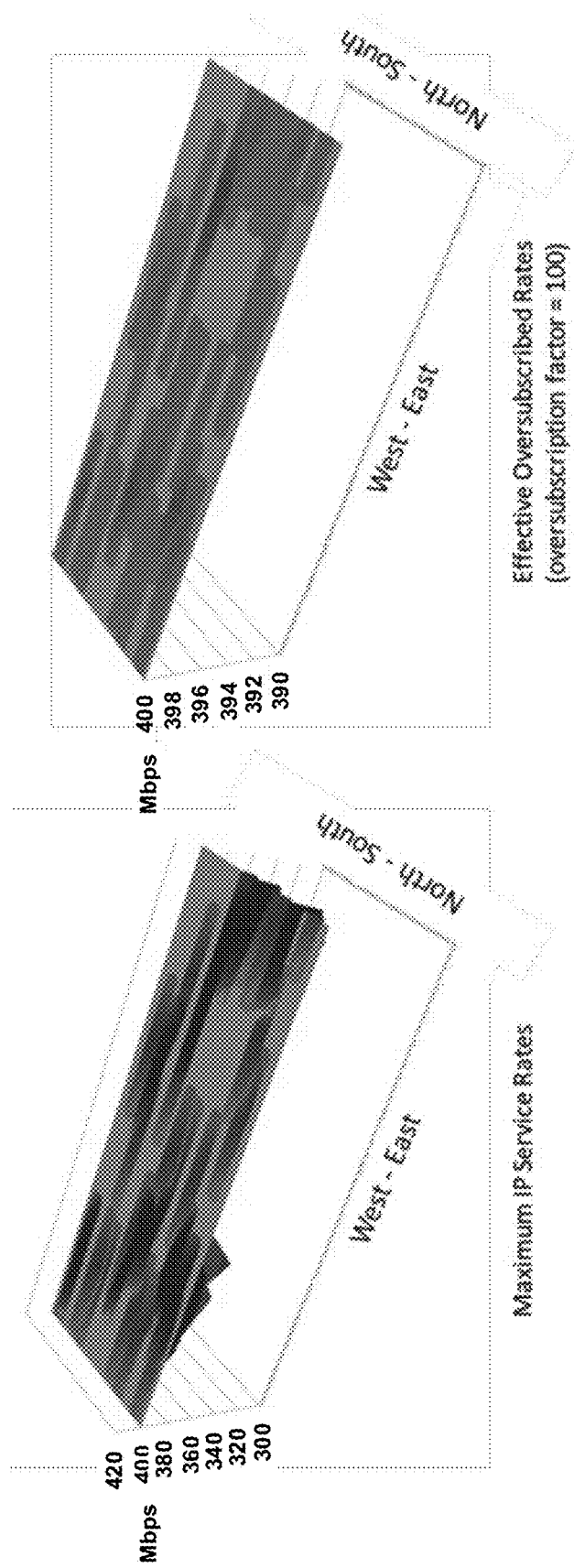
FIG. 9(A) and FIG. 9(B) are plots illustrating VBR Capacity—Demand surfaces according to aspects of the present disclosure.

Turning now to FIG. 9(A) and FIG. 9(B) there is shown two views (left and right) of supply less demand. With reference to those FIGS. 9(A) and 9(B) it may be observed that a set of randomly-placed 10, 30 and 50 Mbps VBR demands are shown. These create a set of partially-overlapping, point-wise demand surfaces that are from a capacity subtracted surface. As presented previously, FIG. 9(A) shows the maximum IP Service rates a customer would really feel, whereas FIG. 9(B) shows the effective rate consumed with an overprovisioning factor of 100. Only the FIG. 9(B) is considered in a speed-based admission control provisioning calculation. Ample capacity remains here (FIG. 9(B)), as the maximum (aggregate) demand never exceeds 63 Mbps, which is the maximum point-wise summation of multiple demand surfaces (0.63 Mbps at 100 factor oversubscription), and so the available capacity anywhere in the area is >=399.37 Mbps. So this would an example of a very lightly-loaded area At this point we note and emphasize that a primary purpose of an Admission Control System—as we shall describe—is to ensure that the point-wise available capacity is never less than zero—anywhere.

Figure 10:
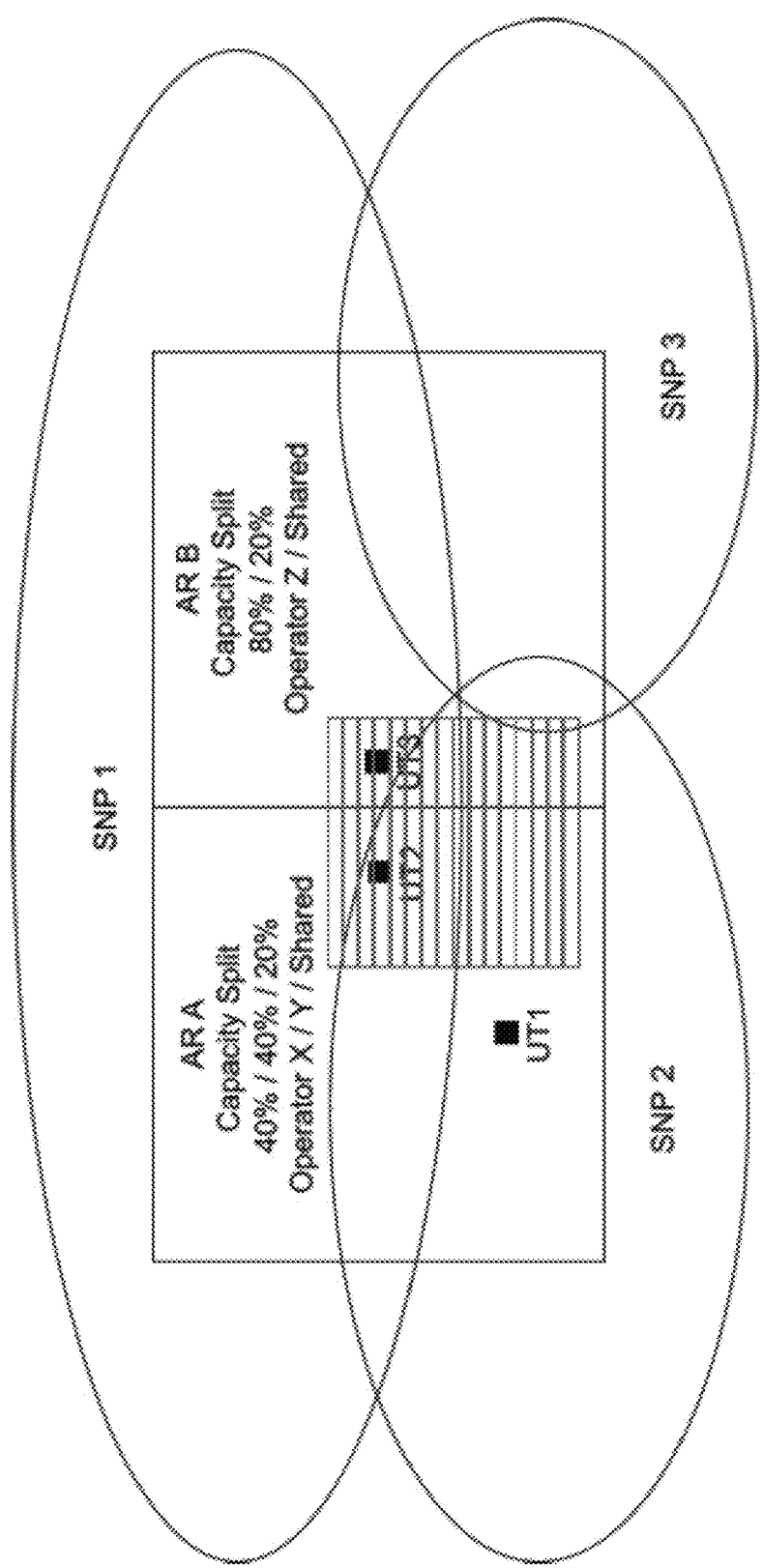
FIG. 10 is a schematic block diagram illustrating Market Capacity Splits, SNP Coverage and Beams according to aspects of the present disclosure.

As will be readily appreciated by those skilled in the art, the admission control problem is made more challenging because of the relative sizes of Administrative Regions (AR) and SNP coverage areas and beam areas; an example of which is shown in FIG. 10., which illustrates Market Capacity Splits, SNP Coverage and Beams.

Administrative regions (shown simply as squares in FIG. 10) represent contiguous, non-overlapping geographic areas (e.g. a country) within squares which one or more Service Providers (SP) (i.e., OneWeb) may have acquired a Capacity Allocation (CA) throughout an AR. Generally speaking, a Service Providers Distributors Cap is a % of capacity of an AR within which a OneWeb distributor partner provides service.

SNP coverage areas (in the figure) represent overlapping geographic areas that cover one or more ARs. SNP coverage areas are large ovals and non-uniform, often larger than entire ARs, but also often sometimes comprising only a fraction of some larger ARs (e.g. imagine Siberia).

Note further with respect to FIG. 10 that Beams (the thin, long rectangles) are also large relative to many ARs, and will often cover more than one at a given time. Most importantly, beams also happen to be the smallest (i.e. most constrained) schedulable air link resource, and so it is beam capacity that must be divided into CAs in various ARs, and then further divided amongst the various SPs' UTs' IP services. And since the beams are moving (North-South), and precessing (East-West), while their theoretical capacity (supply) remains fixed (more or less), their instantaneous load (demand) changes as UTs enter and leave each beam. Their relative fractional supply capacity (as divided between SPs) may also be changing if multiple ARs are covered.

As will now be readily appreciated by those skilled in the art, the traditional wireless approach of "in-cell session-based" AC process is ill-suited to the task at hand. More specifically with respect to the following:

LxP/BxP: Each Beam—controlled by a LxP/BxP—is effectively a "cell", and yet each beam is moving so quickly as to make its present IP traffic demand information rapidly irrelevant (because new UTs continuously enter/leave the beam). The "in cell" view is too myopic and dynamic to make a useful decision.

SNP: SNPs oftentimes will not have full supply and demand information with which to make an AC decision, due to their mutual coverage area overlap and beam coverage dynamics. Many UTs will actually be "ping ponging" (i.e. handing off) between SNPs as a function of satellite movement, raising the question as to which SNP actually "owns" a UT (the answer is neither).

ACP: The ACPs, which acts as the "base stations" from the perspective of the EPC, are perhaps the infrastructure element best suited make an AC decision. Neglecting mobility—the set of UTs they serve is constant. Yet they too have a limited view, and are continuously juggling an ever-changing load of BxPs, which have ever-changing beam demands. Moreover, the capacity of each beam is the same. Therefore, repeatedly making (and remaking) the same admission control decisions for the same traffic against essentially the same resource (a subsequent beam) is redundant.

To solve this problem of air interface resource management, a "broader" view is needed, one which can look across all ARs, Beams, SNPs and ACPs—and see the full demand and supply in any locale, at any scale, independent of SNP/ACP coverage or Beam mobility. Accordingly, methods and systems according to aspects of the present disclosure, advantageously dimension and deploy the IP services (demand) against a predictable and geo-spatially-computable supply model—so that no (i.e. AR) is oversubscribed beyond a desired threshold in any of its CAs (supply) area.

Admission Control System

Figure 11:
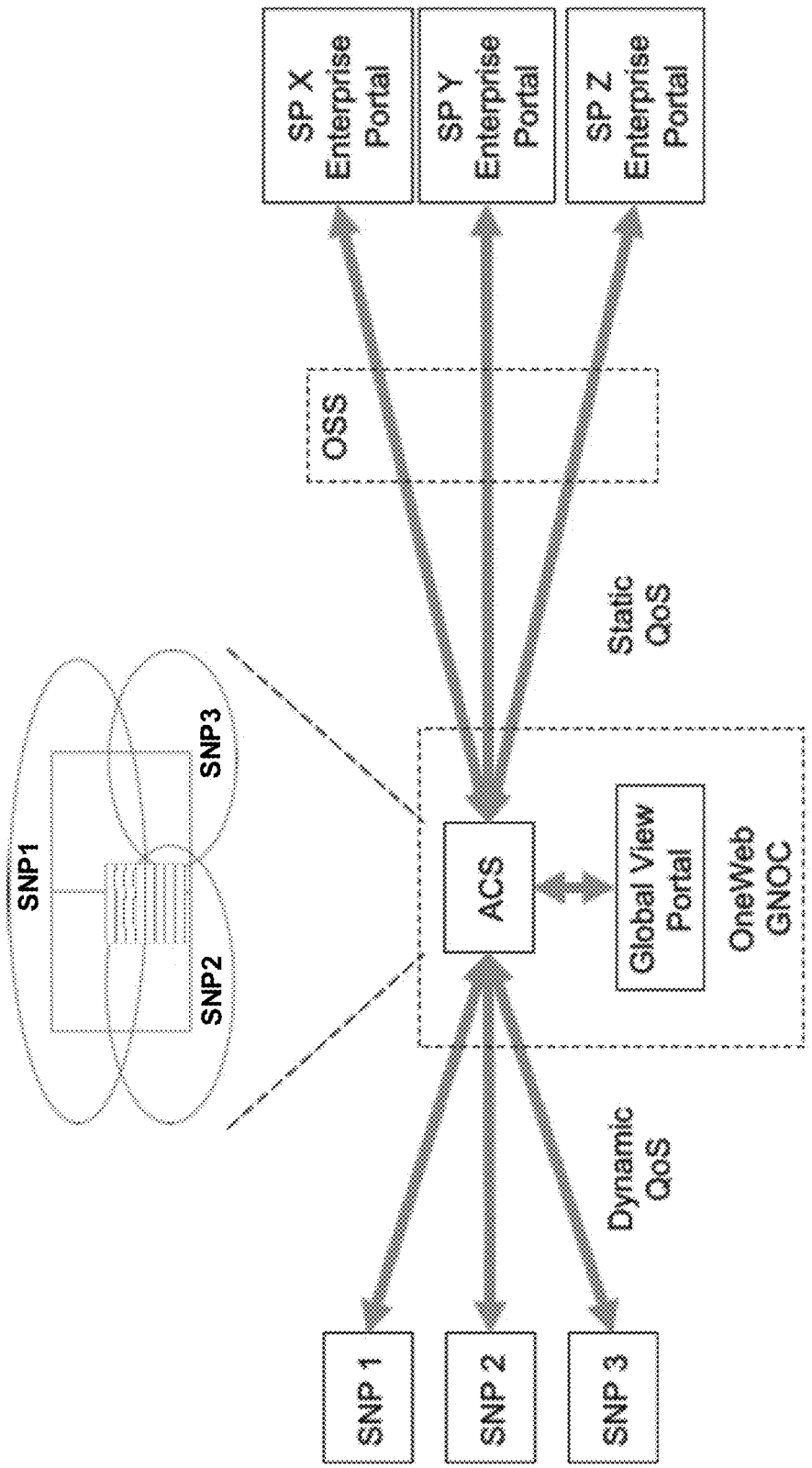
FIG. 11 is a schematic block diagram illustrating an admission control system according to aspects of the present disclosure.

As will now be readily appreciated by those skilled in the art, a global admission control capability is needed and—as we shall show—is realized according to the present disclosure by an (ACS) such as that shown schematically in FIG. 11. As may be understood, the ACS will function within the Global Resource Management System (GRNS) and will provide a Global Network Operations Center (GNOC) a global view of the deployed UTs, and their accordant provisioned and active Service Class (SC) traffic demand. The ACS physical realization may include a globally-federated database, but its management aspects will only take effect locally. A local portion of the federated database may reside in select Point of Presence (POP) locations alongside other POP elements, or may be hosted in the GNOC(s).

Note that a OneWeb POP is generally understood to contain the "upper" portion of the GN (i.e. the ACP), and the local CN components (i.e. Mobility Management Entity (MME) and Serving/Packet GWs (S/P-GW)). Regardless of the GRMS-ACS database's physical composition and location, the GNOC will have a "global view portal" into the database system, and will perceive it as a unified, viewable at any scope and resolution.

Note further that the ACS will have two primary modes of resource management operation, namely a "static" and "dynamic" admission control mode(s).

Static Admission Control

Internet access service typically involves selling a "bit pipe" to a service subscriber. Each pipe may differ, depending on a (QoS) Quality of Service parameter associated with the service (generally including its bandwidth and latency characteristics) and its tariffing model, which can be usage-based (e.g. tonnage) or performance based (i.e. speed). From a technical perspective, each data service will be realized by an IP Service Class (SC), which is a QoS definition specifying its speed (i.e. data rate), latency and other performance parameters over the OneWeb air interface. Associated with each SC is a corresponding Differentiated Services Per-Hop Behavior (PHB) parameter, which indicates its preferred QoS treatment at the IP level.

OneWeb will offer several basic IP Transport Classes from which IP Service Classes may be defined, as discussed within the Transport Classes IP QoS framework architecture specification. These are suitable for crafting three basic forms of service:

Expedited Forwarding Service: suitable for applications like voice or video conferencing.

Basic Data Service: suitable for a variety of traditional IP access services.

Latency-tolerant Service: suitable for machine-to-machine applications utilizing intermittent connectivity.

A Basic Data Service (BDS) is one which handles the set of IP traffic flows for more specialized (non-basic) carriage. not otherwise classified There is only one BDS active per UT at any given time. Each OneWeb BDS will include a Hybrid SC, which will have a Maximum Bit (MBR) parameter and, optionally, a (GBR) parameter which together satisfy the following relationship: 0<=GBR<=MBR. This allows OneWeb to provide purely "best efforts" data services (e.g. where 0=GBR<MBR), traditional telco "leased line" services (where 0<GBR=MBR), and flexibly-blended mixtures where a tailorable portion of the maximum bit rate is guaranteed to always be available (i.e. 0<GBR <MBR). These are referred to as VBR (Variable Bit Rate), GBR (Guaranteed Bit Rate), and Hybrid VBR/GBR services, respectively.

A BDS, once deployed, is "static" (i.e. once provisioned it does not change) and "always on". Offering such services has implications for a system with limited capacity. Essentially, one cannot "turn off" an always-on service. Viewed from the perspective of admission control, once an always-on SC is deployed, the answer to the admittance question for such a SC must always be "yes"—both throughout its service lifetime, and throughout the SC' s Service Region (SR). This statement holds if the serviced entity is fixed (e.g. a home) or mobile (e.g. an airliner). A Service Region is the area in which a UT enabling the SC will operate, and from which it will consume capacity. A fixed UT will consume capacity from one AR. A mobile UT may consume capacity from one or more ARs. A UT will consume capacity from some CA in each AR.

Figure 12:
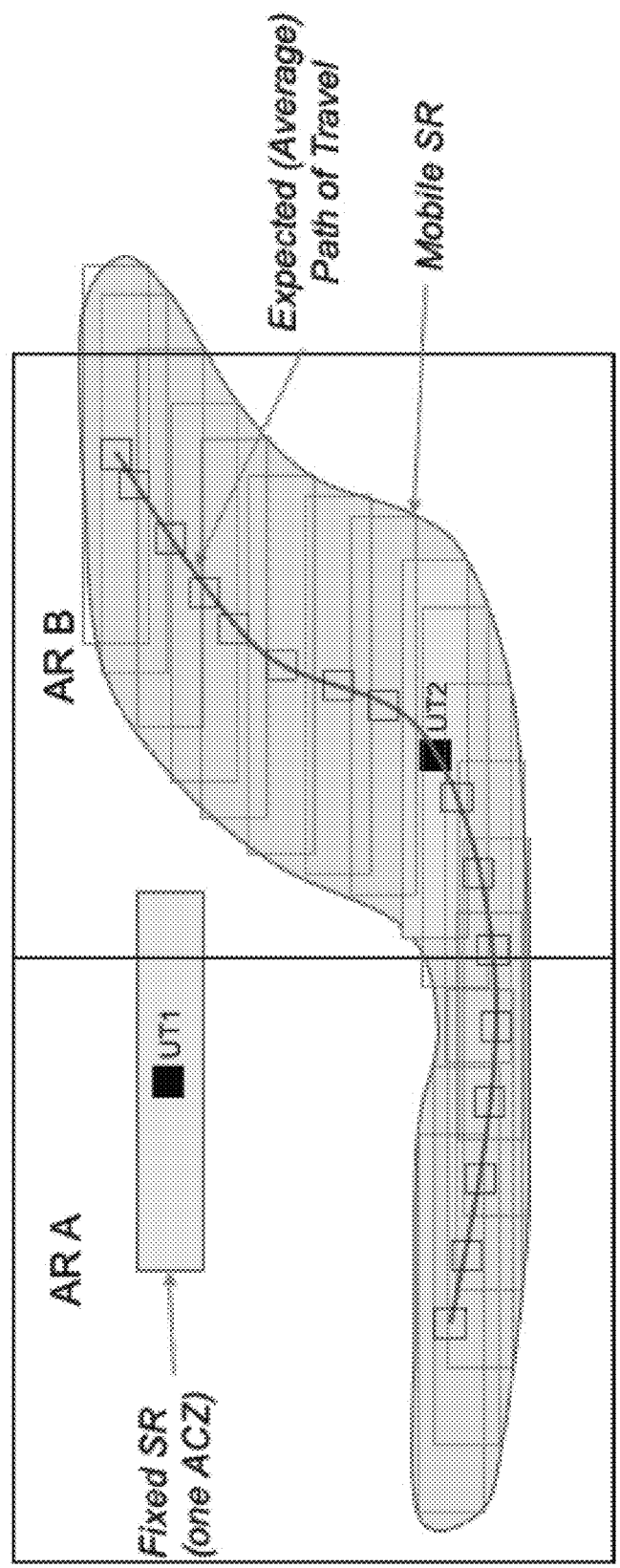
FIG. 12 is a plot illustrating service regions according to aspects of the present disclosure.

All of this requires that prior to deployment (and possibly even at the point of sale), an AC check must be performed by a SP (using its Enterprise prior Portal (EP) into the ACS via OSS as seen in FIG. 11 to ensure that sufficient capacity will exist in the expected SR for the lifetime of the SC. Otherwise the UT risks being denied service by the ACS at the time of deployment For a fixed UT, its SR is simply the ACZ surrounding the location at which the UT will be deployed (see FIG. 12, left side). The necessary capacity must exist at the point—at all times—and is a function of the demand in its surrounding ACZ. Such a check would consider the addition of a new SC into this region, and determine whether or not the new SC could be provisioned and deployed while not harming existing SCs. If the SC is admissible, its deployment is allowed; otherwise not. Note that the only case in which a priori SC admissibility is not required in advance of UT deployment is Commercial Model-1 (CM-1). CM-1 allows rapid on-boarding of OneWeb distributer partners through the use of standard 3 GPP roaming-based settlement procedures which precludes so-called "On Net" UT operation, and consequential integration with Such a check is advisable for all SCs, and should be mandatory for Guaranteed Bit Rate (GBR) or Expedited Forwarding (EF) service. The addition of too many services into a localized region can overload a given capacity allocation, and break the "service contracts" associated with previously deployed services. The admission control procedure here is also easily seen as a process, as it happens "prior" to service deployment. network dimensioning.

Note further that the same AC process is required for mobile services. For a mobile UT, its SR is defined by its path of travel (e.g. for an airliner it could be within mobile path of travel the North Atlantic flyway), and the point-wise demand in the continuous envelope swept by its ACZ during travel must be considered (see FIG. 12—right side). Here a more complex resource management algorithm is required to estimate the demand and supply along such a route, to assess likely worst-case demand requirements, and to determine if a new mobile service is admissible. At the time a mobile service is sold, its SC and associated service region is entered into the ACS to capture the demand.

Network Dimensioning/Service Class "What If" Deployment Planning

A OneWeb distributor partner uses an Enterprise Portal (EP) to see various "views" of its resource capacity (supply) in every AR/CA, its deployed resource IP Services (demand) against that supply, and the resultant effect on IP Service QoS. As we begin to consider the process of network dimensioning, a number of factors must ultimately be taken into account as shown in Table 1—Service Class Deployment Factors.

TABLE 1

| Service Class Deployment Factors | | |
|---|---|---|
| Service Class Deployment Factor | GBR | VBR |
| Capacity Allocation (%) | X | X |
| Satellite Duty Cycle (%) | X | X |
| Local Beam Coverage (%) | X | X |
| UT Mobility | X | |
| Rain Fade Margin | X | |
| GBR vs. VBR Provisioning | X | X |
| Busy Hour Loading Factor | | X |
| Service Class QoS Parameters | X | X |
| Expected SC Usage | | X |

Here, to give a rough "feel" of the kinds of views the EP will render, we primarily consider GBR dimensioning, and the relevant factors of data rate, satellite duty cycle and rain fade, as well as the effect of GBR loads on allocable VBR capacity (we ignore UT mobility for now). Recalling the earlier discussion regarding "surfaces", the "ideal" capacity surface first seen in FIG. 8 is repeated in FIG. 13(A). That surface assumes a nominal 400 Mbps per beam, and a perfectly uniform (i.e. smooth) distribution of beam capacity.

Figures 13A, 13B:
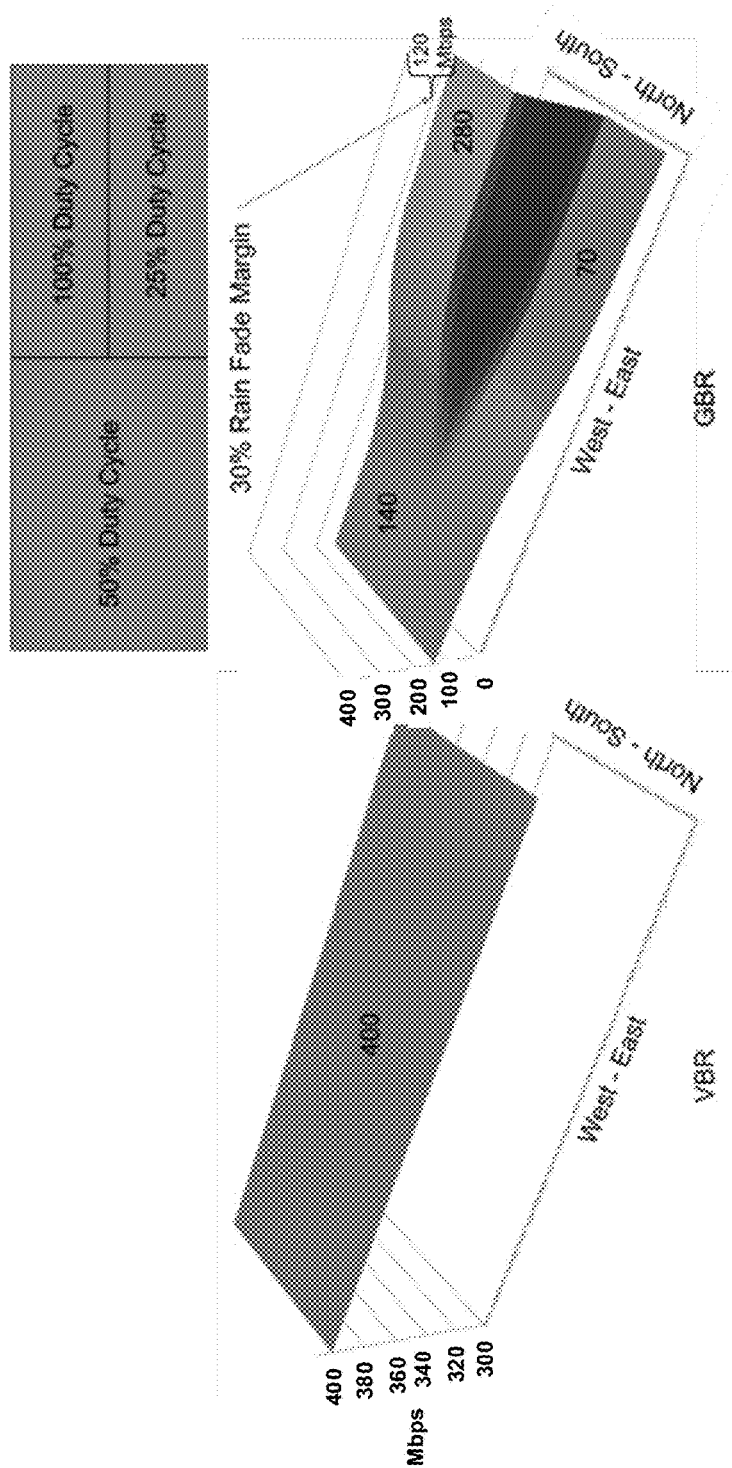
FIG. 13(A) and FIG. 13(B) are plots illustrating GBR Capacity surfaces according to aspects of the present disclosure.

FIG. 13(B) captures two separate effects, namely: Rain Fade Margin and Satellite Duty Cycle.

Rain Fade Margin: GBR service is expected to be provided with a 99.xx % Service Level Availability (SLA). Providing such an SLA requires that a capacity margin be included to allow dynamic air link resource compensation for the likely worst-case effects of rain fade without margin dropping the data rate below its guaranteed level. Here we assume a 30% margin, which reduces the maximum pointwise capacity available for GBR service provisioning to 280 Mbps as shown.

Satellite Duty Cycle: The ideal GBR capacity (left side) assumes that the satellite spot beams are operating with a duty cycle of 100%. That need not be the case, as the duty cycle can be adjusted in ⅛th increments between 0% and 100% to save power on the satellites. FIG. 13(B) depicts a scenario where ¼th of the area is running at 100% (grey), ¼th is operating at only 25% (blue), and the remainder is operating at 50% duty cycle (orange). The effect on pointwise deployable GBR capacity can be seen. The "ramps" in between the various plateaus are more elongated in the West-East direction than in the North-South direction because of beam shape, but are otherwise similar.

Figure 14B:
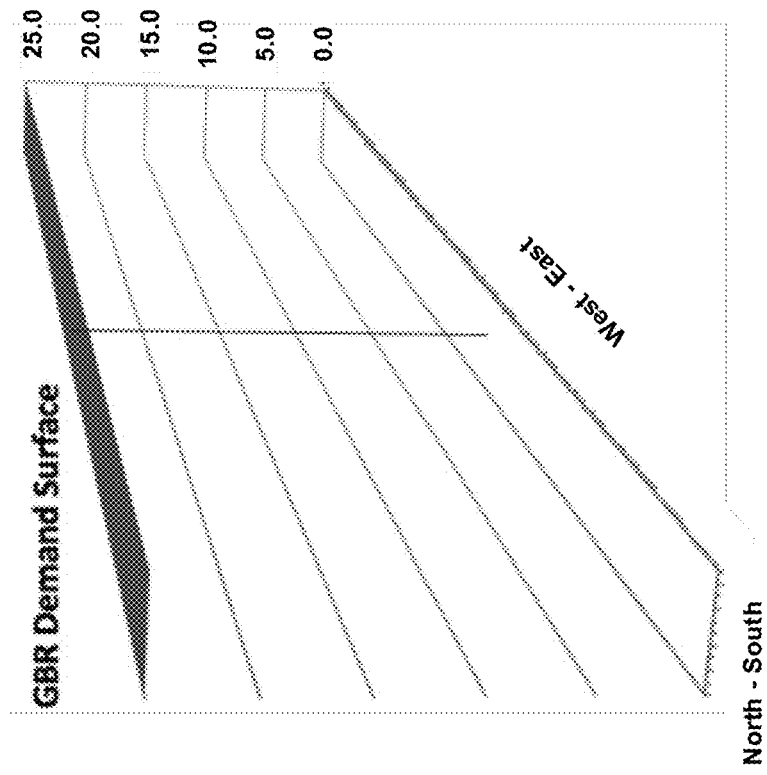
FIG. 14(A) and FIG. 14(B) are plots illustrating VBR and GBR Demand surfaces according to aspects of the present disclosure.
Figure 14A:
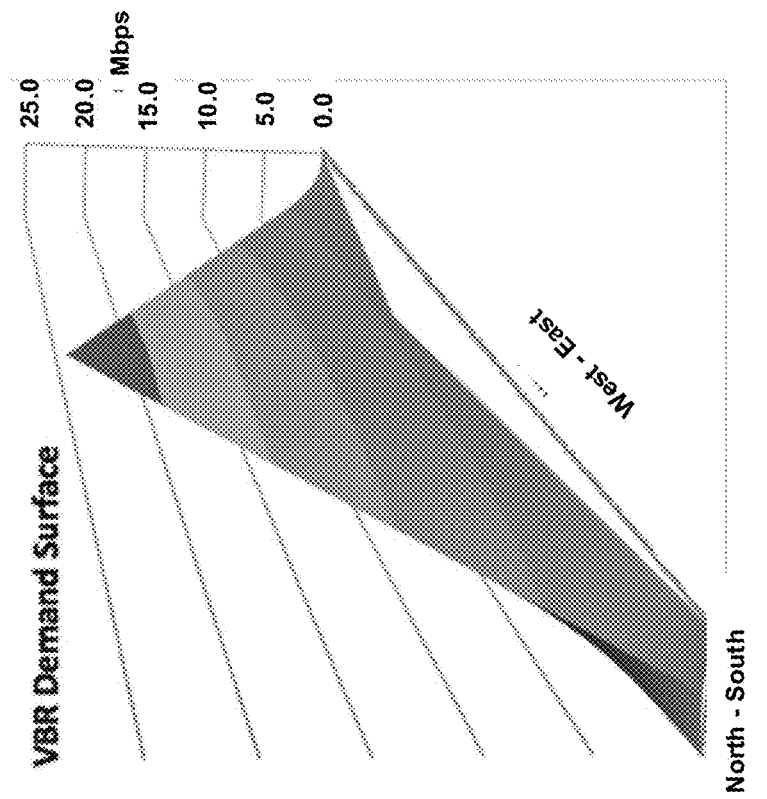

The spatial nature of GBR demand differs from VBR demand. Whereas VBR demand exhibits the "shark fin" shape seen earlier, GBR demand creates the equivalent of a flat "plateau". These two "demand surfaces" are shown in FIG. 14(A) and FIG. 14(B), which display the statistical IP service demand as a function of an area, also termed the spatial demand, where both demands assume an oversubscription factor of 1(which means they are oversubscribed). If we consider the volume under the GBR plateau to 100% of a 25 Mbps demand basis, then the not volume under the 25 Mbps VBR shark fin is only 27.4% (for this grid size), or approximately ¼th the volume under the plateau. Thus a Mbps-equivalent VBR service induces only ~25% of the spatial demand that its corresponding GBR service would.

We have already noted however, that VBR service will typically be oversubscribed (i.e. by a factor >1), and so a given VBR load will only induce a further fraction of the spatial demand shown here.

Figure 15B:
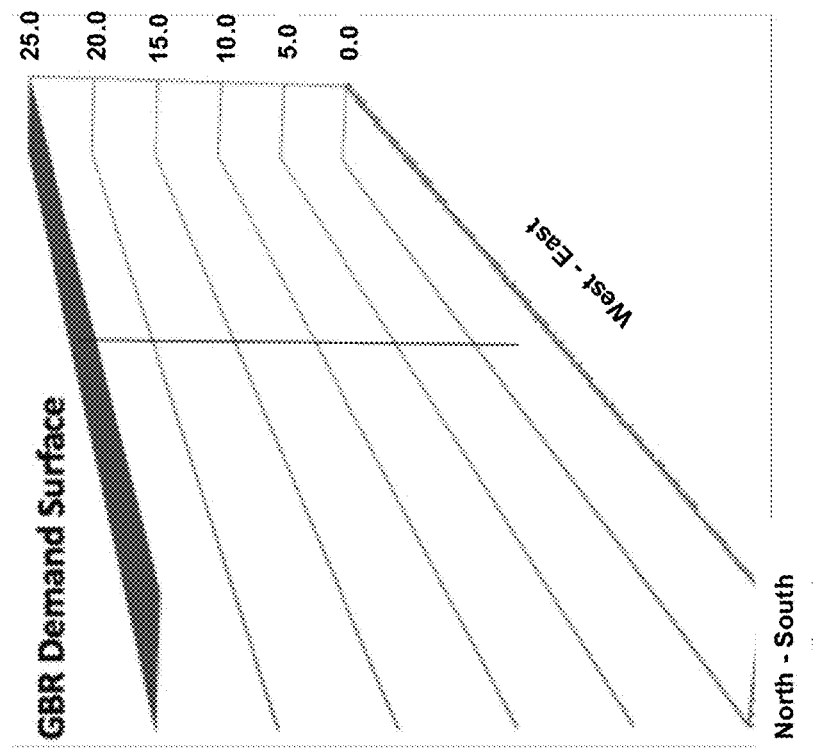
FIG. 15(A) and FIG. 15(B) are plots illustrating oversubscribed VBR and Non-Oversubscribed GBR Demand Surfaces, respectively, according to aspects of the present disclosure.
Figure 15A:
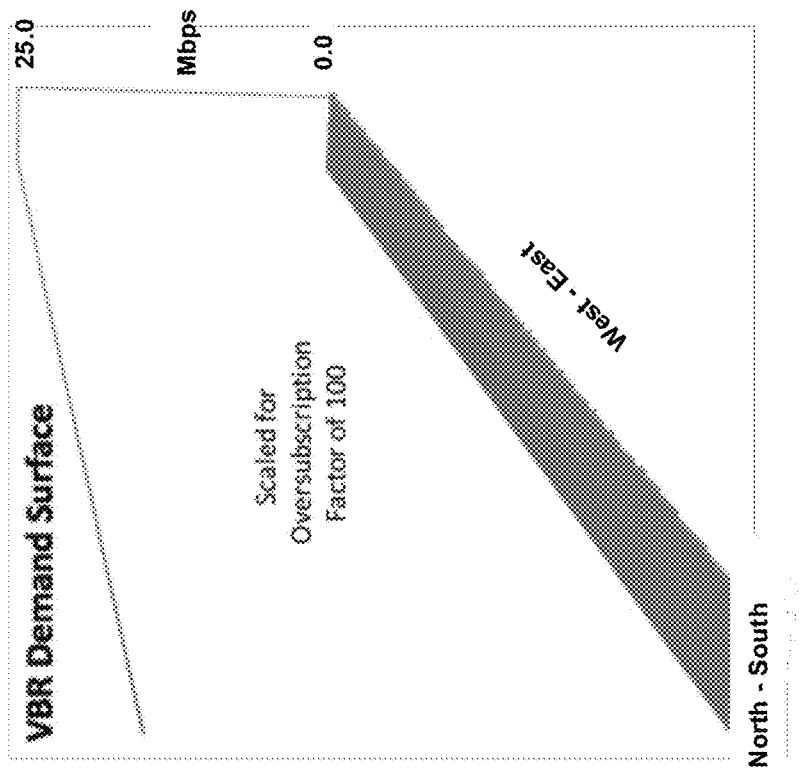
Figures 17A, 17B:
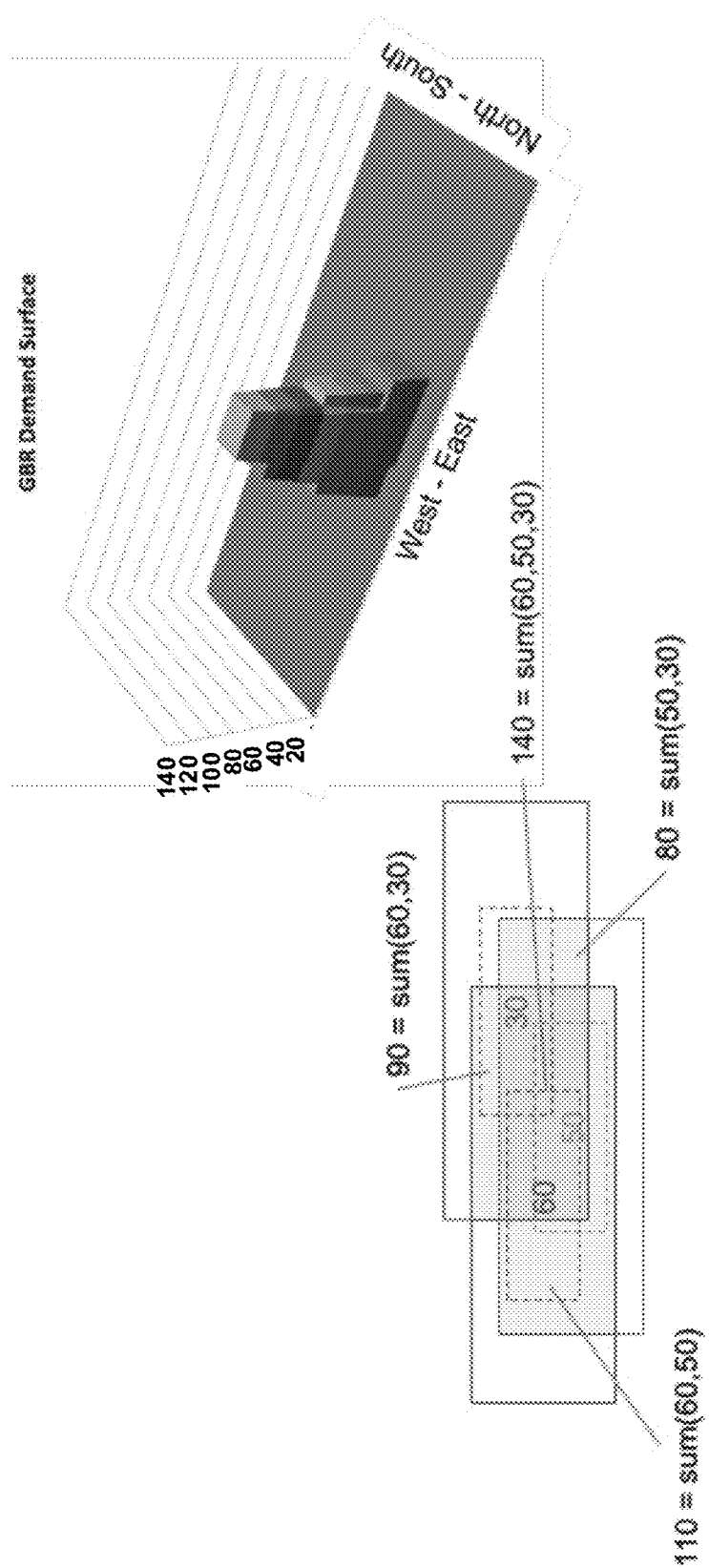
FIG. 17(A) and FIG. 17(B) are a schematic diagram and a plot illustrating triple ACZ overlap according to aspects of the present disclosure.

To see this, we now show a more typical VBR example (with an oversubscription factor =100) as shown graphically in FIG. 15(A) and FIG. 15(B). Here we see the relative spatial demand (in Mbps) from two 25 Mbps services: VBR and GBR. "Non-Oversubscribed GBR" Demand Surface The GBR spatial demand is flat, at 25 Mbps/unit area, whereas the VBR spatial demand exhibits the aforementioned shark fin distribution, but now scaled downwards by a factor of 100. This too is not a precise description of the actual demand, because other factors such as rain fain margin (for GBR) and busy hour loading (for VBR) must be considered in a precise demand calculation. And such a calculation should also be done in Quarks rather than Mbps, the latter being shown here only for familiarity. Here we are roughly approximating the magnitude of the difference for illustrative purposes Earlier, for VBR demand, we saw that two overlapping demand surfaces (i.e. overlapping ACZ's) "added" together. Now, in turning our attention to GBR demand, we observe that two overlapping plateaus induce a spatial demand upon one another in a discontinuous fashion, sometimes "adding", sometimes not, depending on the degree of overlap. The top portion of FIG. 16 shows a GBR Spatial Demand load with its surrounding beam area and ACZ. The bottom two portions show two differing degrees of ACZ overlap for two GBR demands, distinguished by whether or not the respective demands are both contained in the intersection of the ACZ. If they are, then the intersection demand can be "summed" and, if they are not, then the "maximum" of the two demands determines the spatial demand of the intersection Of course this generalizes and a set of 3 overlapping ACZ's appears as seen in FIG. 17(A) and FIG. 17(B), where the 3-D view begins to resemble an Aztec pyramid with stepped plateaus, only with shearer vertical walls.

Figure 18:
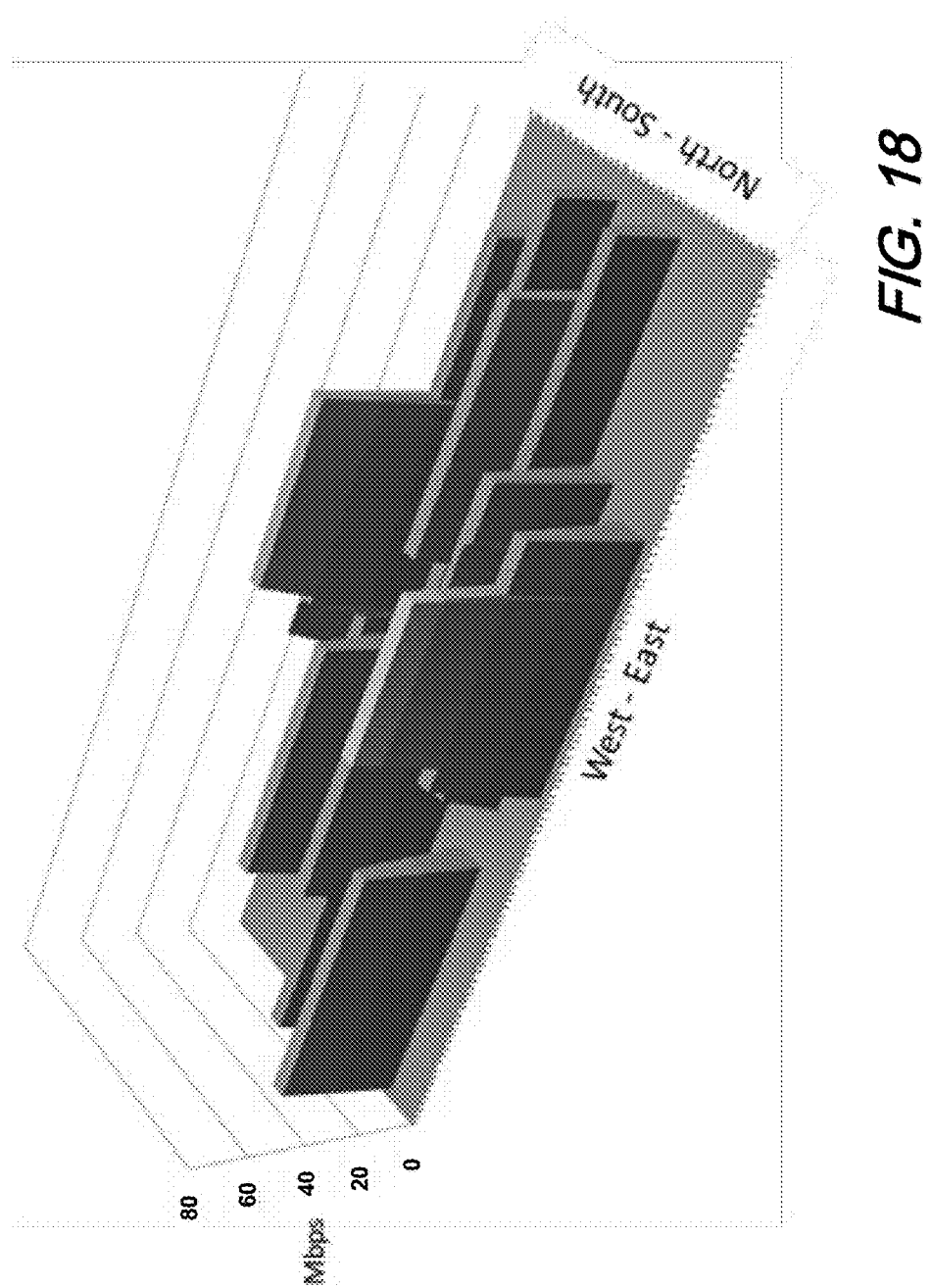
FIG. 18 is a plot illustrating GBR Demand Plateaus according to aspects of the present disclosure.

Generalizing further, we see a number of GBR plateaus depicted in FIG. 18, each corresponding to a GBR demand.

Figures 19A, 19B:
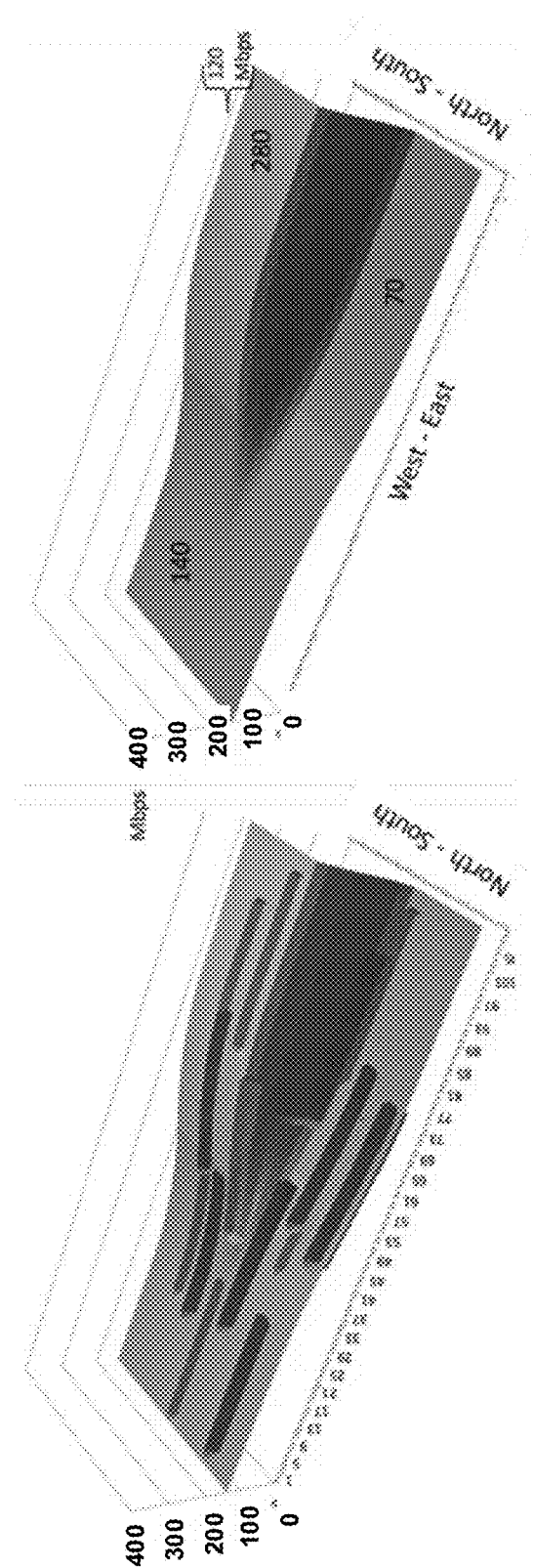
FIG. 19(A) and FIG. 19(B) are plots illustrating Available GBR Capacity surfaces according to aspects of the present disclosure.

These demands are then subtracted from FIG. 19(B) to to obtain the available GBR capacity shown in FIG. 19(A). This view depicts the available (remaining) capacity against which additional GBR demand may be provisioned.

Figures 20A, 20B:
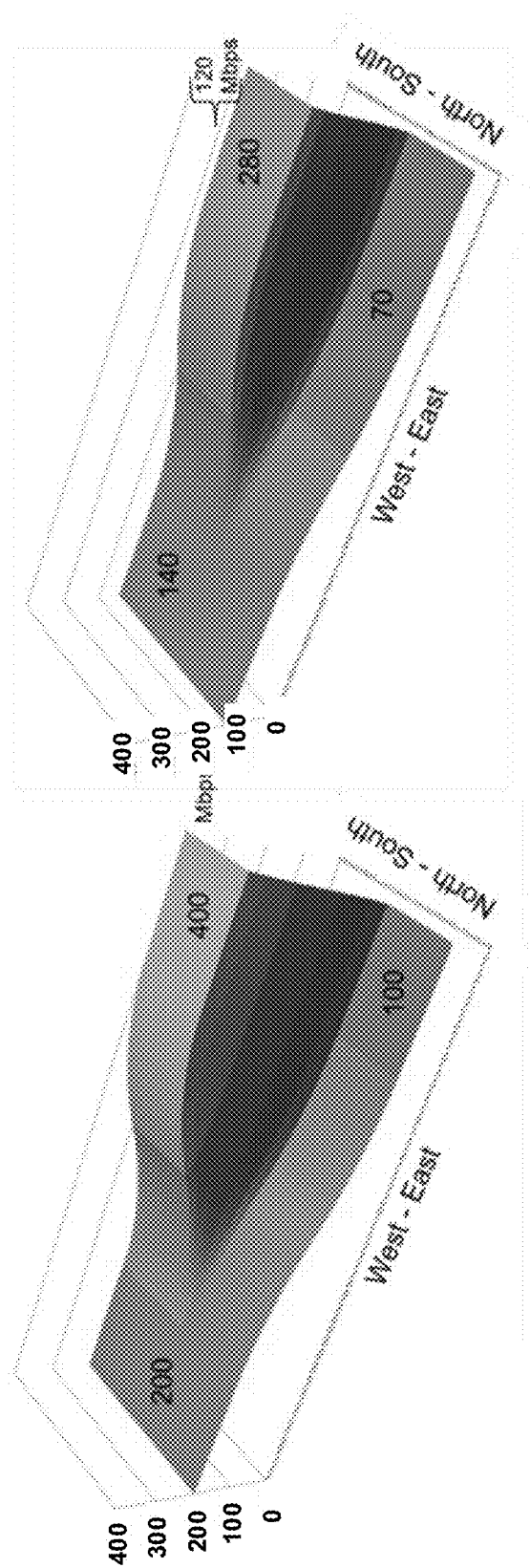
FIG. 20(A) and FIG. 20(B) are plots illustrating Ideal VBR Capacity surfaces according to aspects of the present disclosure.

At this point note that VBR (i.e. non-GBR) service is not expected to be provided with an associated SLA. Consequently, it can be dimensioned against the so-called "clear sky" capacity, which is another name for what is shown in FIG. 20 (A). FIG. 20(B) shows the full GBR capacity. For the moment, ignore the difference in the shapes of the two surfaces as we will shortly return to—and describe—that characteristic.

As noted and as may be observed, FIG. 20(B) still shows the full GBR capacity. For the moment, ignore the difference in the shapes of the two surfaces as we will shortly return to that.

Advantageously, the OneWeb scheduler prioritizes the scheduling of GBR service over VBR service. Consequently, the capacity available for provisioning VBR services must account for (i.e. subtract) any relevant GBR demand. Now referencing FIG. 21(A) and FIG. 21(B), it may be observed that this is shown graphically in FIG. 21(A) which shows the available VBR capacity after both GBR and VBR demand has been removed.

Figure 21B:
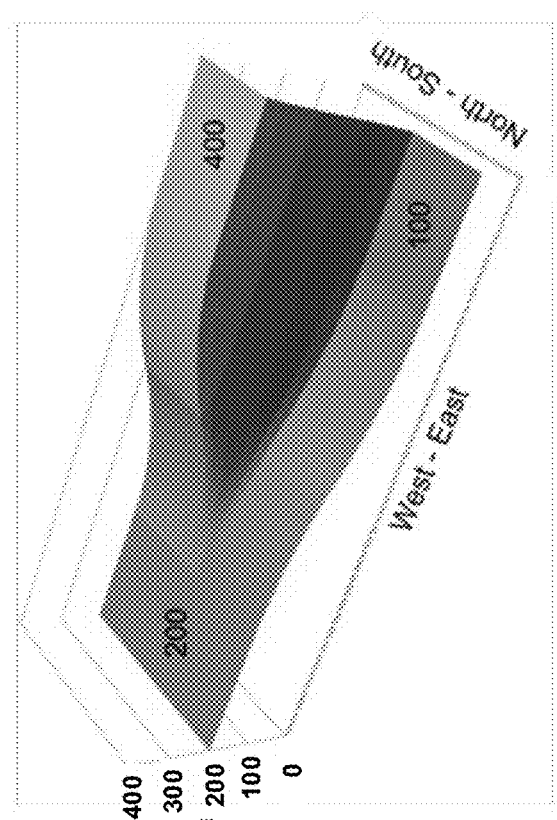
FIG. 21(A) and FIG. 21(B) are plots illustrating Available GBR Capacity VBR surfaces according to aspects of the present disclosure.
Figure 21A:
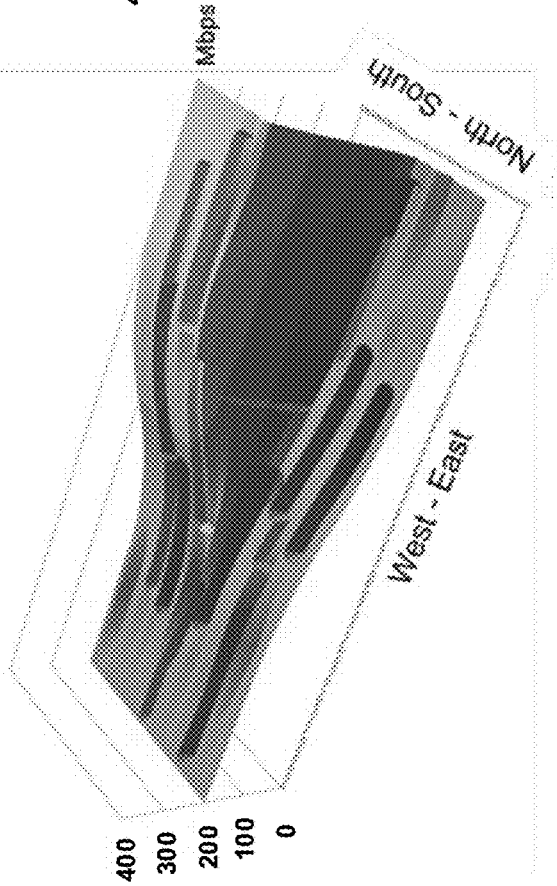

Now, recalling FIG. 21(A) and FIG. 21(B), it becomes apparent that the shapes of the scheduleable VBR and GBR surfaces differ. The difference in the two surfaces derives from the fact that GBR scheduling must take into account the "worst case" rain fade when computing available capacity, whereas VBR scheduling is happy to dimension against the "average" or "expected" capacity. These considerations result in the differing surface shapes shown. Their difference can be seen in FIG. 22, which shows the resultant capacity delta.

As mentioned earlier, the aforementioned surfaces are shown in bps (rate) for ease of understanding relative to the IP Services to be dimensioned. But the underlying supply and demand calculations need be performed in terms of "air resources", or "Quarks". Notionally, a Quark is the "smallest schedulable unit of air interface traffic resource". Specifically, a Quark comprises one Quark Forward Link (FL) Resource Block (RB) or two Reverse Link (RL) RBs in the FL or RL, respectively. Their specific numerology (in Quarks/sec, or Qps) as a function of beam duty cycle.

Figure 23:
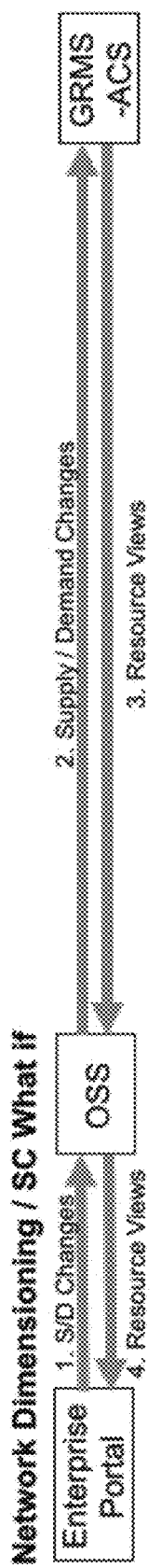
FIG. 23 is a schematic block diagram illustrating Network Dimensioning according to aspects of the present disclosure.

A functional view of network dimensioning with SCs is shown in FIG. 23. IP Service Planning is performed in accordance with an Admission Control Framework (ACF); a framework whose SC admission control algorithms are designed by OneWeb. Each partner is free to use the ACF to define its own Admission Control Policy (ACP) for each AR/CA it manages, but the ACP must always be "feasible" as per what the ACF allows for that partner.

Put simply, in terms of capacity (supply) and traffic (demand), OneWeb controls the supply OneWeb partners control the demand.

A partner can perform so-called "What if" planning to see the impact of changes in supply or demand, or to vary its ACP and assess that impact as shown in FIG. 23.

Note that A partner can initiate any actual changes in SC demand it desires, without interaction with OneWeb, provided it remains within the feasible range of the ACF. This activity is initiated thru the OneWeb OSS system, and propagates thru to the GRMS ACS. Any actual changes in supply would require offline (human-in-the-loop) interaction with OneWeb.

There are different types of views a partner may request as shown in Table 2.

TABLE 2

Types of Views

|  | Projected | Actual | Historic |
|---|---|---|---|
| Demand:Service Class | | | |
| Provisioned | X | | X |
| Active | X | X | X |
| Perspective | X | | |
| Supply:Service Class | | | |
| Active | X | X | X |
| Perspective | X | | |

The actual (near real-time) view of both supply and Figure: Types of Views actual demand should be viewable across an AR, as should their historic view at any point in the past. And projected (i.e. computed) views should be historic projected available for what's provisioned, active and perspective. A projected provisioned view only applies to UTs whose service class demand has projected provisioned been admitted (via a-priori service dimensioning) but not yet been activated. A projected active view applies to both UT SC demand and its a-priori projected active accordant supply. Similarly, a projected perspective view would cover both supply and demand, and constitutes "what if" planning. It's also projected perspective required that a historic provisioned view be kept for archival purposes. historic provisioned view be kept for archival purposes.

Advantageously, it will be possible to contrast comparable views (i.e. projected vs. actual, active vs. perspective, etc.), being viewable from various aspects of supply and demand (GBR, VBR, Total, etc.), and allowing feasible variation of the factors affecting dimensioning (recall Table: Service Class) to permit sophisicated "what if" planning.

UT/SC Admission and Provisioning: Functionally, before a new SC is deployed, the EP shall request admittance of the SC from the ACS. SCs are deemed "admissible" by the ACS in accordance with the partner's ACP. A SC so granted admission would be viewed as provisioned, but not yet active.

Figure 24:
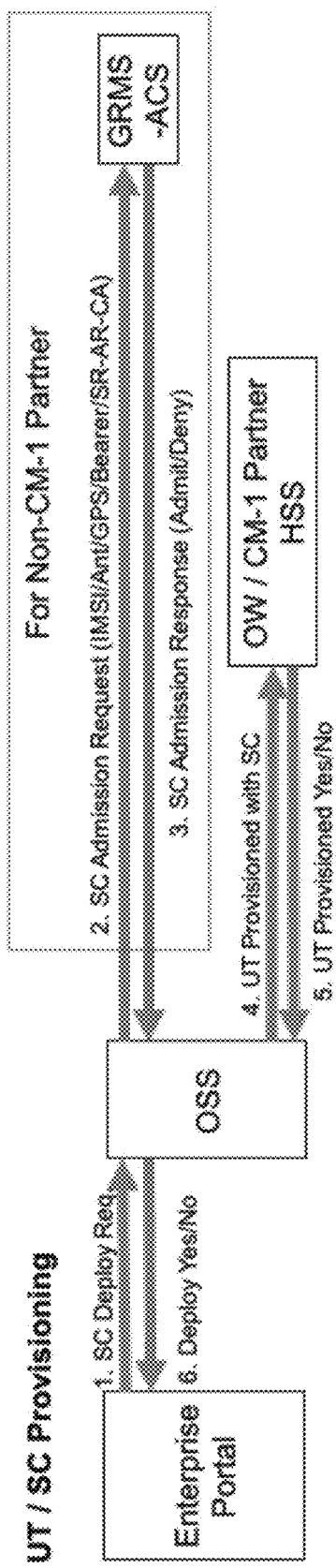
FIG. 24 is a schematic block diagram illustrating UT/SC Admission and Provisioning according to aspects of the present disclosure.

Before we describe this procedure however, it should be noted that OneWeb aims to provide a number of Commercial Models (CM), and that there is one model, denoted CM-1, which omits a-priori admission control (i.e. it skips steps 2 and 3 in FIG. 24). This omission stems from the desire to provide distributor partners with a very simple and fast means of deploying OneWeb Provisioning services without requiring time-consuming and somewhat costly OSS/BSS integration. The omission is possible because we are restricting CM-1 without deployments to only offering VBR services. No GBR services are allowed with CM-1.

A high-level architectural view of SC Admission and UT Provisioning is shown in FIG. 24, and includes the following steps:

and consists of the following Figure: UT/SC SC Admission and Provisioning steps:

1) The EP requests of the OSS deployment of a SC on a given UT, within a given SR, covering one or more AR/CAs.

2) This request is augmented by the OSS as necessary, and an AC request is forwarded to the ACS. The AC request contains UT information (identity (IMSI), antenna type, location (GPS) if fixed) and QoS information (bearer config, service region, AR/CA).

3) If the SC is admissible in accordance with the partner's ACP, then admission is granted; else it is denied. The implication here for CM-1 is that admission is always allowed (steps 2 and 3 are skipped). Thus step 1 leads directly to step 4.

4) Assuming success, the UT can be provisioned in the HSS of either OneWeb (or its CM-1 partner).

5) A success indication is returned to the OSS from the ACS.

6) The success indication is forwarded to the EP from the OSS to the ACS.

Figure 25:
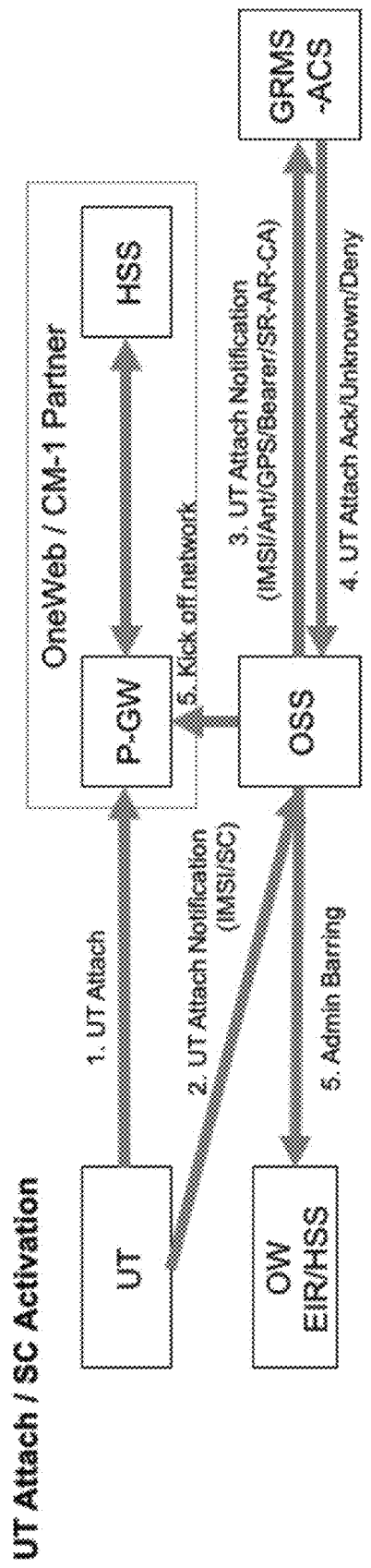
FIG. 25 is a schematic block diagram illustrating UT Attach/SC Activation according to aspects of the present disclosure.

UT Attach/SC Activation: Eventually, a provisioned UT will attach to the network, and its admitted SC(s) will be activated, and thereafter be viewed as active. This process active is shown in FIG. 25 and includes the following steps.

1) When a UT is deployed and attaches to the network, its P-GW will retrieve its SC information from the appropriate HSS and configure the corresponding bearers. This provides the UT with IP connectivity.

2) The UT subsequently notifies the OSS of its attachment, and conveys its pre-configured UT and QoS information (as described in step 2 in the preceding section) to the OSS.

3) The OSS records and sends this information to the GRMS ACS. The ACS then either: a) records the activation of a SC (non-CM-1), or b) records the activation of a non-admitted SC (CM-1), or c) denies activation for some administrative reason.

4) The ACS signals allowance or denial, noting whether or not it had previously seen this UT.

5) If the ACS denies admission, it may take immediate effect (kick off network), or may take effect the next time the UT tries to connect (Administrative Barring). This choice is determined by the partner.

Note that the UT attach notification (step 3) serves to: 1) notify the ACS of CM-1 UTs/SCs (if present), and 2) keep the ACS up-to-date regarding deployed/active UTs and SCs.

Note that this holds for both fixed and mobile services. This information, when combined with the UT's earlier provisioned SR information for each UT, allows the ACS to have an accurate picture of the globally-deployed, active QoS SCs (and their SRs), and is always able to make an AC decision for any new SC prior to its deployment. This information provides a means to monitor the location/SR of each UT to ensure it has not deviated from its provisioned/admitted service contract.

At this point we note that Administrative Barring may take a number of forms:

1) For CM-1, in the event a newly admitted UT exceeds the available resources (as per ACP), the CS OSS will add this UT to the CN EIR blacklist which will keep it from attaching to our OneWeb network. The CS OSS will add it to the Wholesale Distributors account and set its state to "Barred due to Insufficient Network Resources". The CS BSS/CRM will send an email to the Wholesale Distributor identifying that the UT has been administratively barred from the network. It will remain in the black list until an administrative process occurs to address the resource issue.

2) For all other CM's, the admission control shall occur prior to the provisioning of the SIM in the CN. If there is insufficient resource, then the SIM is never provisioned in the CN which will keep it from attaching to our OneWeb network. However, if a pre-provisioning admittance check was not done for whatever reason (mistake/operator override, etc.), and upon attachment insufficient resources exist, then the CS OSS will add it to the Wholesale Distributors account and set it's state to "Barred due to Lack of Resources".

Depending on how the UT provisioning order was entered, the CS BSS/CRM will do one of the following: a) Order Entry via the Enterprise Portal—Display and error web page indicating the UT provisioning or admittance failed due to "Insufficient Network Resources"; b) Order Entry via B2B Web Services API—Return a message (XML or JSON) indicating that the UT provisioning or admittance failed due to "Insufficient Network Resources"; c) Order Entry via Batch File—Return the Batch File with the specific SIM Card (IMEI, IMSI and MSDIN) with a Provisioning/Admittance Failure Code of "Insufficient Network Resources.

Note further that the CN EIR will also be used to gray list or blacklist SIM cards for other Terms of Service violations (e.g., UT is uncertified, UT was reported lost/stolen, etc.).

Advantageously, thru the use of AC checks and resource planning (prior to [or just after CM-1] deployment), or ultimately at the time of attachment, the set of admitted SCs remains feasible, regardless of beam pattern coverage, SNP overlap, etc. Thus, AC checks are not required as beams pass by. However, should an operator overload its CA in a given AR (through a mistake or negligence, or perhaps intentionally), only its subscribers would suffer, because a hierarchical scheduler allocating capacity within each AR is designed to protect the CAs of other operators sharing a market from excessive borrowing by an overloaded operator. Thus, operators are incentivized to not overload their CA.

Expedited Forwarding: Certain UTs may be configured to support an Expedited Forwarding (EF) PHB in addition to their BDS PHB mentioned previously. The EF PHB Expedited Forwarding will require a corresponding (additional) EF SC that has lower latency targets than the BDS SC (e.g. 100 ms vs. 300 ms) and so has relatively lower higher priority access to capacity. An EF SC will be deployed with a GBR parameter specified. Thus, from an admission control perspective, the EF traffic should also be viewed as "GBR" traffic and treated as such.

Dynamic Admission Control: Session-based QoS is sometimes (in other networks) utilized in support of bandwidth-intensive, interactive applications such as a video call. Such session-based QoS support would require what we term Dynamic AC. Dynamic AC also happens on handoff in mobile Dynamic AC systems for such sessions. So too will be the case here should this prove necessary.

The manner in which session-based QoS support is requested differs, depending on the application and its relationship to the underlying network. Sometimes applications reside in a host device, and make a QoS request to the host OS which, in turn, requests QoS support from the corresponding network interface over which support is needed. This results in the interface modem requesting that the appropriate SC be admitted into the access network, and this mode of QoS signaling is often referred to as host or mobile-initiated. More commonly in 3 GPP systems, a host application interacts with an application counterpart on the network side, and the networked counterpart makes a QoS signaling SC request of the access network. This is often referred to as network-initiated signaling. In either case, the QoS request ultimately finds its way to the network element managing the access interface resources (i.e. a base station in cellular networks) which must make an AC decision.

Here, as we have already noted, the base station-equivalent (the SNP) is ill-equipped to make an AC decision. However, when asked such a question, it is possible for the SNP to relay the SC AC query to the ACS, which is Figure: Admission Control System already aware of all active SCs. As before, the session may or may not be allowed to proceed. Also as before, if the SC is open question mobile admitted, the SNP is responsible for maintaining its state (as an active SC) in the ACS, and for removing it when the session completes. Thus, the demand due to all application-specific sessions will also be known to the ACS and factored into its AC decisions Dedicated vs. Shared Capacity Allocations: Capacity allocations are envisioned to be either "dedicated" or "shared". A is occupied and managed by a single SP, whereas a Dedicated CA S is occupied by multiple SPs. Shared CAs may be used to provide capacity for larger area/global services, where a large fraction ofhared CA the service is, and where multiple mobility "fleets" within an AR's shared CA will need to be co-managed by the cooperating SPs, with mobile authoritative oversight provided by OneWeb or a mobility services partner.

Supply and Demand: The maximum "supply" of capacity (i.e. a CA) is determined contractually at the business level, and is typically fixed for any given AR. Admission control decisions are made against this maximum supply. Oftentimes, however, the "demand" for capacity will be less than this maximum (e.g. less diurnal usage patterns). The GRMS is responsible for managing local supply availability over time and space, while simultaneously managing satellite power expenditure to remain within a global power budget. It does so by modulating each satellite's duty cycle between 0% and 100% on a per-orbit basis. Since the ACS is aware of the state of all deployed UT's and their active SCs, the GRMS can couple this knowledge with the "data analytics" learned regarding IP traffic "demand" over time (e.g. diurnal usage patterns) so as to best match supply and demand whilst minimizing satellite power expenditure.

ACS and BxP/AxP (Scheduler) Relationship:The ACS operates with partial knowledge of how the BxP/AxP scheduler is built, and how it will schedule the admitted SCs. In contrast, the BxP/AxP is unaware of the concept admission control, other than knowing that it must ask the ACS for AC decisions to support dynamic session QoS. The BxP/AxP must accept all active SCs (as UTs and SCs come and go) and adapt its scheduling accordingly.

As mentioned earlier, the ACS implementation localized localized server instances operating against a globally-federated DB. A key implementation decision rests with the type of DB to use (SQL or NoSQL). Cassandra is a good candidate NoSQL DB to consider, as it could easily handle any level of AC dynamics (reads/writes) that our system could generate. But SQL approaches (relational DBs) should not be ruled out a priori, as the level of AC dynamics may not be all that high (many initial SC entries will be static), and relational query processing is powerful.

Still, it may be best for OneWeb to err on the side of caution and begin with a DB that is known to scale to whatever degree needed. Big data analytics are readily implemented atop a well-crafted, multi-table Cassandra schema. "SQL like" features are being added to Cassandra over time. Oddly enough, "writes" are relatively "free" in Cassandra, so writing consistent data across many tables is the way to go. The data model is crafted so that the necessary "views" (needed on reading) for fast AC decisions then follow naturally.

Summary: The ACS maintains the state of all provisioned and active SCs across the globe. It removes the requirement for the SNPs to perform both static and dynamic AC checks by offloading this state and computation to a cloud-based resource. The ACS additionally provides the GNOC a global picture of satellite air interface demand and usage, which is segment-able by market, operator, service, etc. As such it provides a capacity management capability, useful at the point of sale and by SP service planners.

Figure 26:
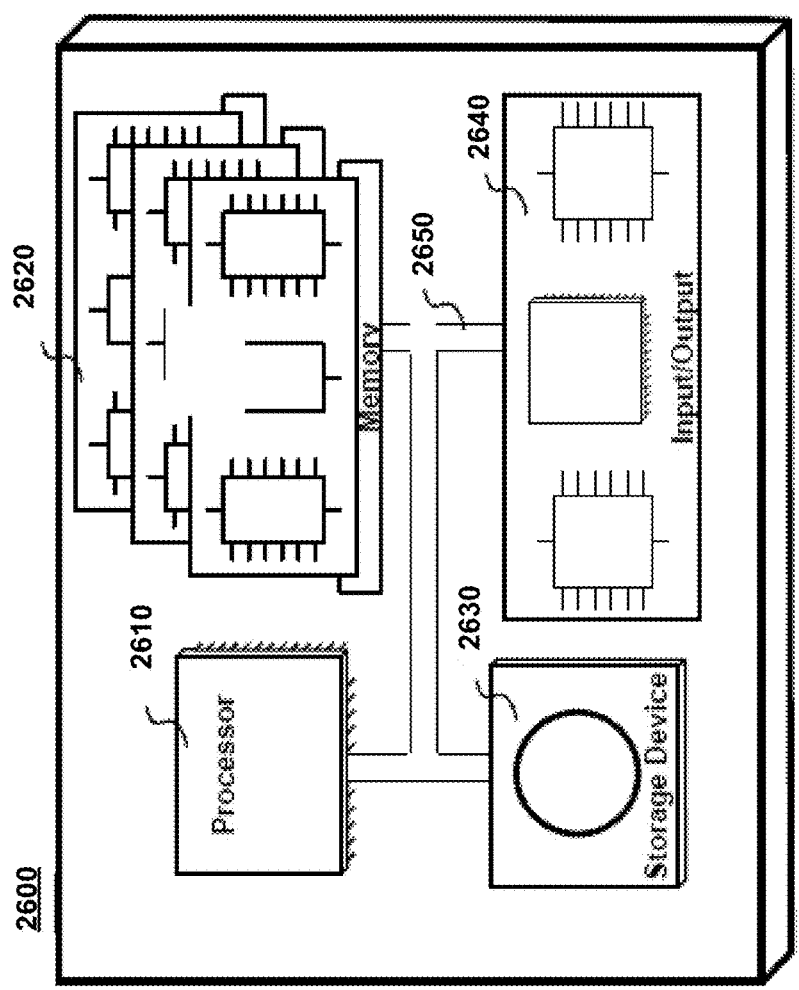
FIG. 26 is a schematic block diagram illustrating a computer system that may be employed to execute methods or integrated as part of systems according to aspects of the present disclosure.

Finally, FIG. 26 shows an illustrative computer system 2600 suitable for implementing methods and systems according to aspects of the present disclosure. As may be immediately appreciated, such a computer system may be integrated into another system and may be implemented via discrete elements or one or more integrated components. The computer system may comprise, for example a computer running any of a number of operating systems. The above-described methods of the present disclosure may be implemented on the computer system 2600 as stored program control instructions.

Computer system 2600 includes processor 2610, memory 2620, storage device 2630, and input/output structure 2640. One or more input/output devices may include a display 2645. One or more busses 2650 typically interconnect the components, 2610, 2620, 2630, and 2640. Processor 2610 may be a single or multi core. Additionally, the system may include accelerators etc. further comprising a system on a chip.

Processor 2610 executes instructions in which embodiments of the present disclosure may comprise steps described in one or more of the Drawing figures. Such instructions may be stored in memory 2620 or storage device 2630. Data and/or information may be received and output using one or more input/output devices.

Memory 2620 may store data and may be a computer-readable medium, such as volatile or non-volatile memory. Storage device 2630 may provide storage for system 2600 including for example, the previously described methods. In various aspects, storage device 2630 may be a flash memory device, a disk drive, an optical disk device, or a tape device employing magnetic, optical, or other recording technologies.

Input/output structures 2640 may provide input/output operations for system 2600.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. An admission control system for a satellite-based Internet access and transport network including a plurality of user terminals connected to a terrestrial ground network via low Earth orbit satellite constellations, the terrestrial ground network further connected to a core network, comprising at least a packet data network gateway, which in turn is connected to the Internet, the admission control system comprising:
   a globally federated database configured to provide status information with respect to the user terminals, the terrestrial ground network, the low Earth orbit satellite constellations and the core network; and
   a computer system, in communication with at least a portion of the globally federated database, that executes program control instructions to:
   (1) admit user terminals for use in one or more respective service regions, wherein each admitted user terminal is associated with and enables a respective service class and a respective service subscriber, wherein each service region is an area in which a user terminal that enables a respective service class operates and from which it consumes capacity,
   (2) enable a static admission control mode that is configured to always allow service subscribers to access the satellite-based network for the lifetime of the service subscriber's service, and
   (3) enable a dynamic admission control mode that is configured to selectively allow service subscribers to access the satellite-based network for session-based quality of service support, based on the status information provided by the globally federated database;
   wherein the admission control system is configured to provide access to the satellite-based Internet access and transport network that includes a moving set of satellite spot beams each having independent schedules.

2. The system according to claim 1, wherein the static admission control mode is further configured to provide a basic data service that handles a set of IP traffic flows not otherwise classified for specialized carriage wherein there is only one basic data service active per user terminal at any given time.

3. The system according to claim 1, wherein: (1) each satellite spot beam is characterized by a satellite spot beam area; (2) at least one user terminal is fixed in location; and (3) the at least one user terminal that is fixed in location has a service region with an area that is substantially twice the satellite spot beam area, wherein the service region is an area from which the at least one user terminal operates and from which it consumes capacity.

4. The system according to claim 3, further comprising an enterprise portal interface configured to communicate with a plurality of service provider enterprise portals.

5. The system according to claim 4, further comprising an operations support system interposed between the service provider enterprise portal and the computer system.

6. The system according to claim 1, wherein the computer system always admits a predetermined model of user terminals.

7. The system according to claim 6, wherein the predetermined model of user terminals that are always admitted are not associated with a guaranteed bit rate service class.

8. The system according to claim 1, wherein the computer system determines whether to admit a user terminal based on the status information provided by the globally federated database.

9. The system according to claim 8, wherein the computer system admits a user terminal if the status information indicates that sufficient capacity will exist in its respective service region for the lifetime of its respective service class.

* * * * *